United States Patent
Li et al.

(10) Patent No.: US 11,984,097 B2
(45) Date of Patent: May 14, 2024

(54) DISPLAY APPARATUS HAVING A WHITEBOARD APPLICATION WITH MULTI-LAYER SUPERIMPOSITION AND DISPLAY METHOD THEREOF

(71) Applicant: HISENSE VISUAL TECHNOLOGY CO., LTD., Shandong (CN)

(72) Inventors: Baocheng Li, Shandong (CN); Min Wang, Shandong (CN); Zhenbao Zhang, Shandong (CN); Ying Cao, Shandong (CN); Jiashan Liu, Shandong (CN); Hong Yu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/157,324

(22) Filed: Jan. 20, 2023

(65) Prior Publication Data
US 2023/0162704 A1    May 25, 2023

Related U.S. Application Data

(63) Continuation of application No. PCT/CN2021/117796, filed on Sep. 10, 2021.

(30) Foreign Application Priority Data

| Oct. 30, 2020 | (CN) | ......................... 202011188310.2 |
| Dec. 22, 2020 | (CN) | ......................... 202011528031.6 |
| Feb. 8, 2021  | (CN) | ......................... 202110171543.X |

(51) Int. Cl.
*G09G 5/14*    (2006.01)
*G06F 3/041*   (2006.01)
(Continued)

(52) U.S. Cl.
CPC ............... *G09G 5/14* (2013.01); *G06F 3/041* (2013.01); *G06F 3/0488* (2013.01);
(Continued)

(58) Field of Classification Search
CPC ........................................................ G09G 5/14
(Continued)

(56) References Cited

U.S. PATENT DOCUMENTS

| 5,121,442 A | 6/1992 | Togawa et al. |
| 2011/0001756 A1 | 1/2011 | Burley |

(Continued)

FOREIGN PATENT DOCUMENTS

| CN | 101150682 A | 3/2008 |
| CN | 101321240 A | 12/2008 |

(Continued)

OTHER PUBLICATIONS

International Search Report, dated Oct. 28, 2021, from PCT/CN2021/117796.

*Primary Examiner* — Long D Pham
(74) *Attorney, Agent, or Firm* — Workman Nydegger

(57) ABSTRACT

A display apparatus and a display method for a multi-layer superimposition are provided. When a display presents a user interface, a touch trajectory from a user can be detected via a touch component, and a touch trajectory pattern is present in a first layer; upon obtaining the touch trajectory pattern, an interpolation operation can also be performed on the touch trajectory pattern in the first layer according to a background pattern in a second layer; finally, a converted pattern obtained after the interpolation operation and the background pattern are superimposed and presented on the display.

20 Claims, 15 Drawing Sheets

(51) Int. Cl.
  *G06F 3/0488*  (2022.01)
  *G06T 3/4007*  (2024.01)
  *G06T 7/90*  (2017.01)

(52) U.S. Cl.
  CPC .............. *G06T 3/4007* (2013.01); *G06T 7/90* (2017.01); *G06T 2207/10024* (2013.01); *G09G 2354/00* (2013.01)

(58) Field of Classification Search
  USPC ......................................................... 345/173
  See application file for complete search history.

(56) References Cited

U.S. PATENT DOCUMENTS

| | | | |
|---|---|---|---|
| 2011/0026081 A1 | 2/2011 | Hamada et al. | |
| 2013/0322780 A1 | 12/2013 | Huang | |
| 2014/0306901 A1* | 10/2014 | Takeuchi | G06F 3/0488 |
| | | | 345/173 |
| 2014/0327689 A1 | 11/2014 | Maravelias | |
| 2015/0279074 A1 | 10/2015 | Xiong | |
| 2016/0139778 A1* | 5/2016 | An | H04N 5/272 |
| | | | 345/173 |
| 2017/0083761 A1 | 3/2017 | Liu et al. | |
| 2018/0321840 A1* | 11/2018 | Watanabe | G06F 3/0486 |
| 2020/0134879 A1 | 4/2020 | Seiler et al. | |

FOREIGN PATENT DOCUMENTS

| | | |
|---|---|---|
| CN | 102354480 A | 2/2012 |
| CN | 102411790 A | 4/2012 |
| CN | 102479065 A | 5/2012 |
| CN | 102568253 A | 7/2012 |
| CN | 103366705 A | 10/2013 |
| CN | 103399698 A | 11/2013 |
| CN | 104424473 A | 3/2015 |
| CN | 104811677 A | 7/2015 |
| CN | 105049827 A | 11/2015 |
| CN | 105719328 A | 6/2016 |
| CN | 105719332 A | 6/2016 |
| CN | 105894554 A | 8/2016 |
| CN | 106453941 A | 2/2017 |
| CN | 106600664 A | 4/2017 |
| CN | 106874017 A | 6/2017 |
| CN | 107193794 A | 9/2017 |
| CN | 107615770 A | 1/2018 |
| CN | 107783937 A | 3/2018 |
| CN | 108834426 A | 11/2018 |
| CN | 110377264 A | 10/2019 |
| CN | 110851062 A | 2/2020 |
| CN | 112181207 A | 1/2021 |
| CN | 112672199 A | 4/2021 |
| EP | 3051484 A2 | 8/2016 |
| IN | 111625179 A | 9/2020 |
| WO | 2018119632 A1 | 7/2018 |
| WO | 2020015269 A1 | 1/2020 |

* cited by examiner

DISPLAY APPARATUS HAVING A WHITEBOARD APPLICATION WITH MULTI-LAYER SUPERIMPOSITION AND DISPLAY METHOD THEREOF

CROSS REFERENCE TO RELATED APPLICATIONS

This application is a continuation of International Application No. PCT/CN2021/117796, filed on Sep. 10, 2021, which claims priority to the Chinese patent application No. 202110171543.X filed on Feb. 8, 2021, the Chinese patent application No. 202011528031.6 filed on Dec. 22, 2020 and the Chinese patent application No. 202011188310.2 filed on Oct. 30, 2020, the entire contents of which are incorporated herein by reference.

FIELD

The disclosure relates to the technology of display apparatuses, in particular to a display apparatus, a method for recognizing geometry patterns and displaying a multi-layer superimposition.

BACKGROUND

In a conference scenario and an education scenario, a display apparatus with a touch function usually installs a "demonstration whiteboard" application. When a user starts the "demonstration whiteboard" application, a display can display a drawing area, the user can draw a specific touch action trajectory in the drawing area through a sliding touch instruction, and a controller determines a touch action pattern through a touch action detected by a touch component, and controls the display to display in real time, to meet a demonstration effect.

SUMMARY

The disclosure provides a display apparatus, including a display, configured to display an image and/or user interface; a touch component, configured to detect a touch trajectory from a user; and a controller, connected with the display and touch component. The controller is configured to: present a first layer and a second layer below the first layer on the display during running of a whiteboard application, wherein the first layer is configured to receive the touch trajectory from the user, the second layer is configured to present elements of the whiteboard application, and the elements of the whiteboard application include a menu and a toolbar; obtain a touch trajectory pattern from the user in the first layer and a background pattern in the second layer, wherein resolution of the touch trajectory pattern is different from resolution of the background pattern; extract a boundary color and a boundary position of the touch trajectory pattern; extract a background color of a region associated with the boundary position from the second layer; determine an interpolation result according to the boundary color and the background color, and perform an interpolation operation on the touch trajectory pattern to generate a converted pattern; wherein resolution of the converted pattern is equal to the resolution of the background pattern; and superimpose the converted pattern and the background pattern to control the display to present a superimposition result of the converted pattern and the background pattern.

In some embodiments of the disclosure, the controller is further configured to: receive the touch trajectory from the user in real time; extract a foreground color of the touch trajectory in response to the touch trajectory; and present the touch trajectory in the first layer according to the foreground color to generate the touch trajectory pattern.

In some embodiments of the disclosure, the controller is further configured to: in response to determining that the resolution of the touch trajectory pattern is equal to the resolution of the background pattern, superimpose the touch trajectory pattern and the background pattern and not perform interpolation operation.

In some embodiments of the disclosure, the controller is further configured to: detect transparency of the background pattern; in response to the transparency of the background pattern being full transparent or semitransparent, obtain a bottom pattern in a third layer below the second layer; superimpose the background pattern and the bottom pattern; and present a superimposition result of the background pattern and the bottom pattern in the second layer.

In some embodiments of the disclosure, the controller is further configured to: detect the resolution of the background pattern and resolution of the bottom pattern; in response to the resolution of the background pattern being less than the resolution of the bottom pattern, extract a bottom color from the third layer; perform interpolation operation on the background pattern according to the bottom color; and superimpose the background pattern after the interpolation operation and the bottom pattern.

In some embodiments of the disclosure, the controller is further configured to: traverse feature points in the touch trajectory; determine a color picking area in the second layer according to positions of the feature points; and obtain the background pattern by extracting pixel values and alpha value of the color taking area.

In some embodiments of the disclosure, the controller is further configured to: detect an endpoint in the touch trajectory from the user; and in response to determining that the touch trajectory includes the endpoint, add the touch trajectory pattern to the second layer; and update the background pattern in the second layer.

In some embodiments of the disclosure, the first layer is a group of pictures (GOP) layer; and the second layer is an on-screen display (OSD) layer.

In some embodiments of the disclosure, the third layer is a video layer.

In some embodiments of the disclosure, the touch trajectory is represented by R channel parameter, G channel parameter, B channel parameter and alpha channel parameter.

The disclosure provides a method for displaying a multi-layer superimposition. The method includes: presenting a first layer and a second layer below the first layer on a display during running of a whiteboard application, wherein the first layer is configured to receive a touch trajectory from a user, the second layer is configured to present elements of the whiteboard application, and the elements of the whiteboard application include a menu and a toolbar; obtaining a touch trajectory pattern from the user in the first layer and a background pattern in the second layer, wherein resolution of the touch trajectory pattern is different from resolution of the background pattern; extracting a boundary color and a boundary position of the touch trajectory pattern; extracting a background color of a region associated with the boundary position from the second layer; determining an interpolation result according to the boundary color and the background color, and performing an interpolation operation on the touch trajectory pattern to generate a converted pattern; wherein resolution of the converted pattern is equal to the resolution of the background pattern; and superimposing the converted pattern and the background pattern to control the display to present a superimposition result of the converted pattern and the background pattern.

In some embodiments of the disclosure, the method further includes: receiving the touch trajectory from the user in real time; extracting a foreground color of the touch trajectory in response to the touch trajectory; and presenting the touch trajectory in the first layer according to the foreground color to generate the touch trajectory pattern.

In some embodiments of the disclosure, the method further includes: in response to determining that the resolution of the touch trajectory pattern is equal to the resolution of the background pattern, superimposing the touch trajectory pattern and the background pattern and not perform interpolation operation.

In some embodiments of the disclosure, the method further includes: detecting transparency of the background pattern; in response to the transparency of the background pattern being full transparent or semitransparent, obtaining a bottom pattern in a third layer below the second layer; superimposing the background pattern and the bottom pattern; and presenting a superimposition result of the background pattern and the bottom pattern in the second layer.

In some embodiments of the disclosure, the method further includes: detecting the resolution of the background pattern and resolution of the bottom pattern; in response to the resolution of the background pattern being less than the resolution of the bottom pattern, extracting a bottom color from the third layer; performing interpolation operation on the background pattern according to the bottom color; and superimposing the background pattern after the interpolation operation and the bottom pattern.

In some embodiments of the disclosure, the method further includes: traversing feature points in the touch trajectory; determining a color picking area in the second layer according to positions of the feature points; and obtaining the background pattern by extracting pixel values and alpha value of the color taking area.

In some embodiments of the disclosure, the method further includes: detecting an endpoint in the touch trajectory from the user; and in response to determining that the touch trajectory includes the endpoint, adding the touch trajectory pattern to the second layer; and updating the background pattern in the second layer.

In some embodiments of the disclosure, the first layer is a GOP layer; and the second layer is an OSD layer.

In some embodiments of the disclosure, the third layer is a video layer.

In some embodiments of the disclosure, the touch trajectory is represented by R channel parameter, G channel parameter, B channel parameter and alpha channel parameter.

DETAILED DESCRIPTION OF THE EMBODIMENTS

In order to make objectives, implementations and advantages of the disclosure clearer, exemplary implementations of the disclosure will be clearly and completely described below in combination with the accompanying drawings in exemplary embodiments of the disclosure. Apparently, the described exemplary embodiments are only part of the embodiments of the disclosure, not all of them.

Figure 1:
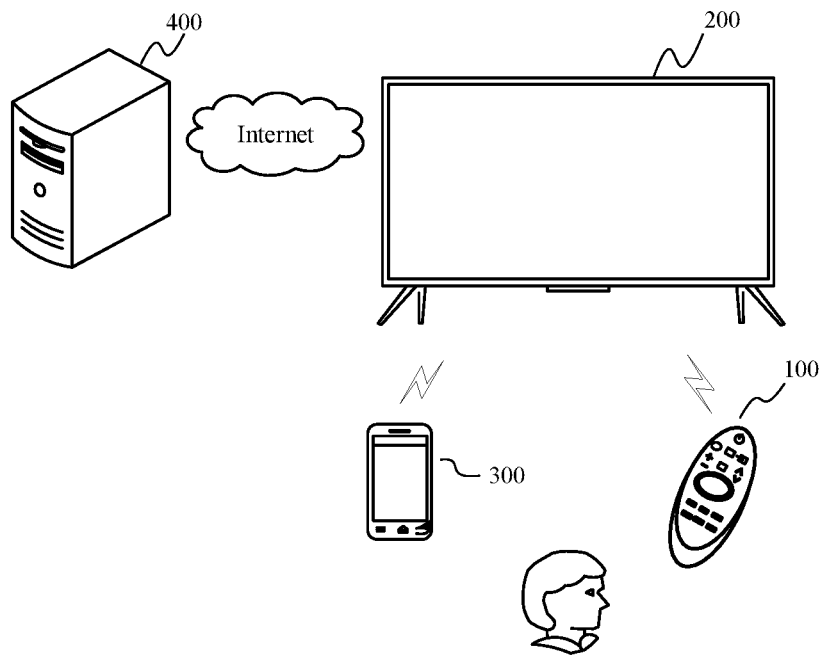
FIG. 1 illustrates a schematic diagram of an operation scenario between a display apparatus and a control device according to one or more embodiments of the disclosure.

FIG. 1 illustrates a schematic diagram of an operation scenario between a display apparatus and a control device according to one or more embodiments of the disclosure. As shown in FIG. 1, a user can operate the display apparatus 200 through a mobile terminal 300 and the control device 100. The control device 100 may be a remote control, communication between the remote control and the display apparatus includes infrared protocol communication and Bluetooth protocol communication, and the display apparatus 200 is controlled in wireless or other wired modes. The user may control the display apparatus 200 by inputting a user command through keys on the remote control, voice input, control panel input and the like. In some embodiments, the display apparatus 200 may also be controlled by using a mobile terminal, a tablet computer, a computer, a notebook computer and other intelligent devices.

In some embodiments, software applications may be installed on both the mobile terminal 300 and the display apparatus 200 to realize connection and communication through a network communication protocol, and further realize the purposes of one-to-one control operations and data communication. Audio and video contents displayed on the mobile terminal 300 may also be transmitted to the display apparatus 200 to realize a synchronous display function. The display apparatus 200 is further in data communication with a server 400 through various communication modes. The display apparatus 200 may perform communication connection through a local area network (LAN), a wireless local area network (WLAN) or other networks. The server 400 may provide various contents and interactions for the display apparatus 200. The display apparatus 200 may be a liquid crystal display, an organic light-emitting diode (OLED) display or a projection display apparatus. In addition to providing a television function of broadcast receiving, the display apparatus 200 may further additionally provide a smart network television function which a computer supports.

Figure 2:
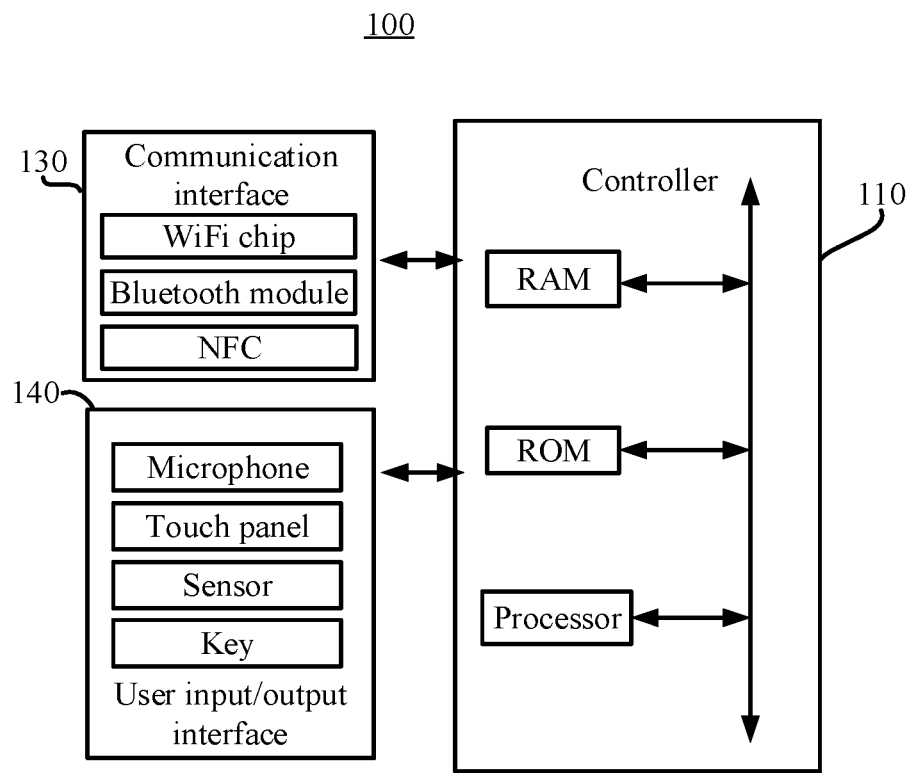
FIG. 2 illustrates a block diagram of hardware configuration of a display apparatus 200 according to one or more embodiments of the disclosure.

FIG. 2 illustrates a block diagram of configuration of a control device 100 in exemplary embodiments. As shown in FIG. 2, the control device 100 includes a controller 110, a communication interface 130, a user input/output interface 140, a memory and a power supply.

The control device 100 may receive a command from a user and convert the command into an instruction which can be recognized and responded by the display apparatus 200, which plays an interaction intermediary role between the user and the display apparatus 200. The communication interface 130 is used for external communication, and includes at least one of a WIFI chip, a Bluetooth module, a near field communication (NFC) or other modules. The user input/output interface 140 includes at least one of a microphone, a touch panel, a sensor, a key or other modules.

Figure 3:
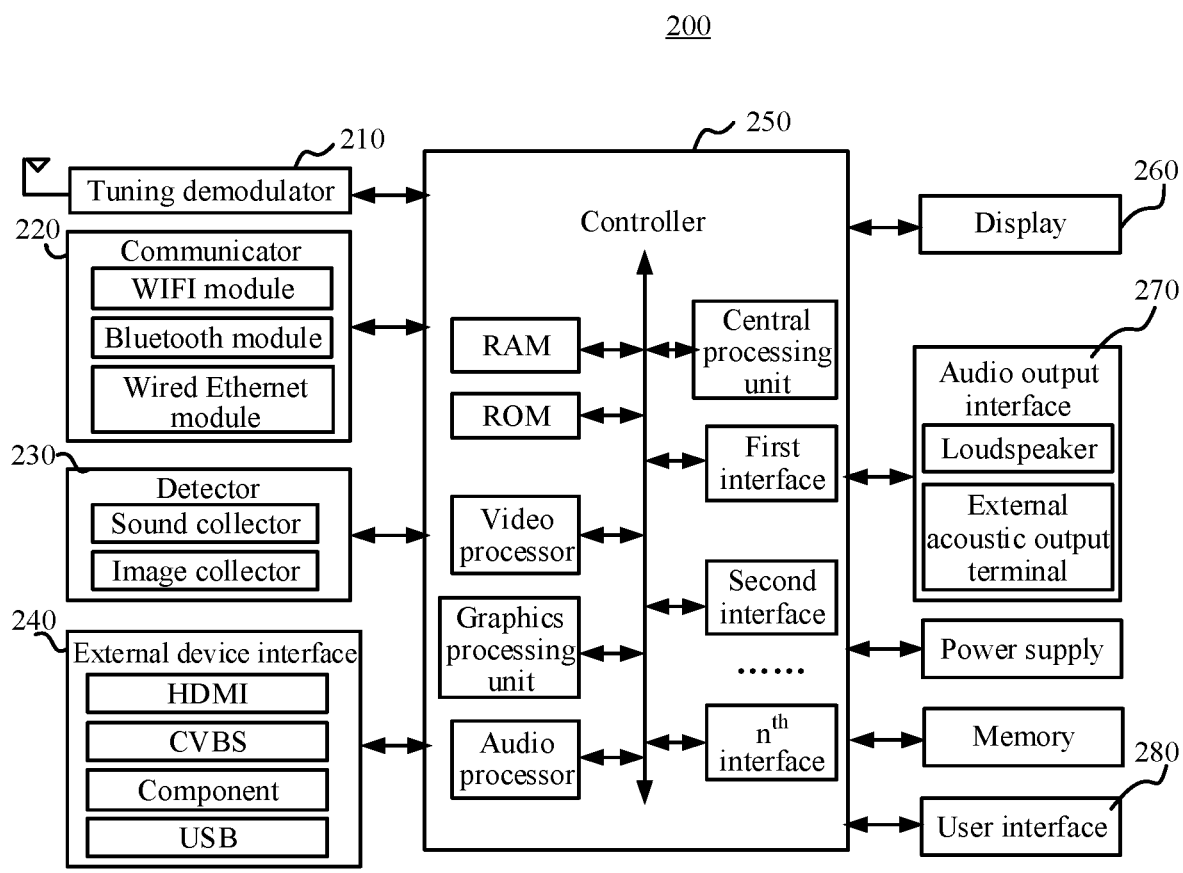
FIG. 3 illustrates a block diagram of hardware configuration of a control device 100 according to one or more embodiments of the disclosure.

FIG. 3 illustrates a block diagram of hardware configuration of a display apparatus 200 according to exemplary embodiments. As shown in FIG. 3, the display apparatus 200 includes at least one of a tuning demodulator 210, a communicator 220, a detector 230, an external device interface 240, a controller 250, a display 260, an audio output interface 270, a memory, a power supply or a user interface 280. The controller includes a central processing unit, an audio processor, a graphics processing unit, a random access memory (RAM), a read-only memory (ROM), and a first interface to an n$^{th}$ interface for input/output. The display 260 may be at least one of a liquid crystal display, an OLED display, a touch display or a projection display, and may further be a projection apparatus and a projection screen. The tuning demodulator 210 receives broadcast television signals in a wired or wireless reception mode, and demodulates audio and video signals, such as electrical program guide (EPG) data signals, from a plurality of wireless or wired broadcast television signals. The detector 230 is configured to collect signals from external environment or signals for interaction with the outside. The controller 250 and the tuning demodulator 210 may be located in different individual device, that is, the tuning demodulator 210 may also be located in an external device of a main device where the controller 250 is located, such as an external set-top box.

In some embodiments, the controller 250 controls the display apparatus to work and responds to user's operations through various software applications stored on the memory. The controller 250 controls an overall operation of the display apparatus 200. The user may input a user command on a graphics user interface (GUI) displayed on the display 260, and the user input interface receives the user command through the GUI. Alternatively, the user may input a user command by inputting specific sound or gesture, and the user input interface recognizes the sound or gesture through a sensor to receive the user command.

Figure 4:
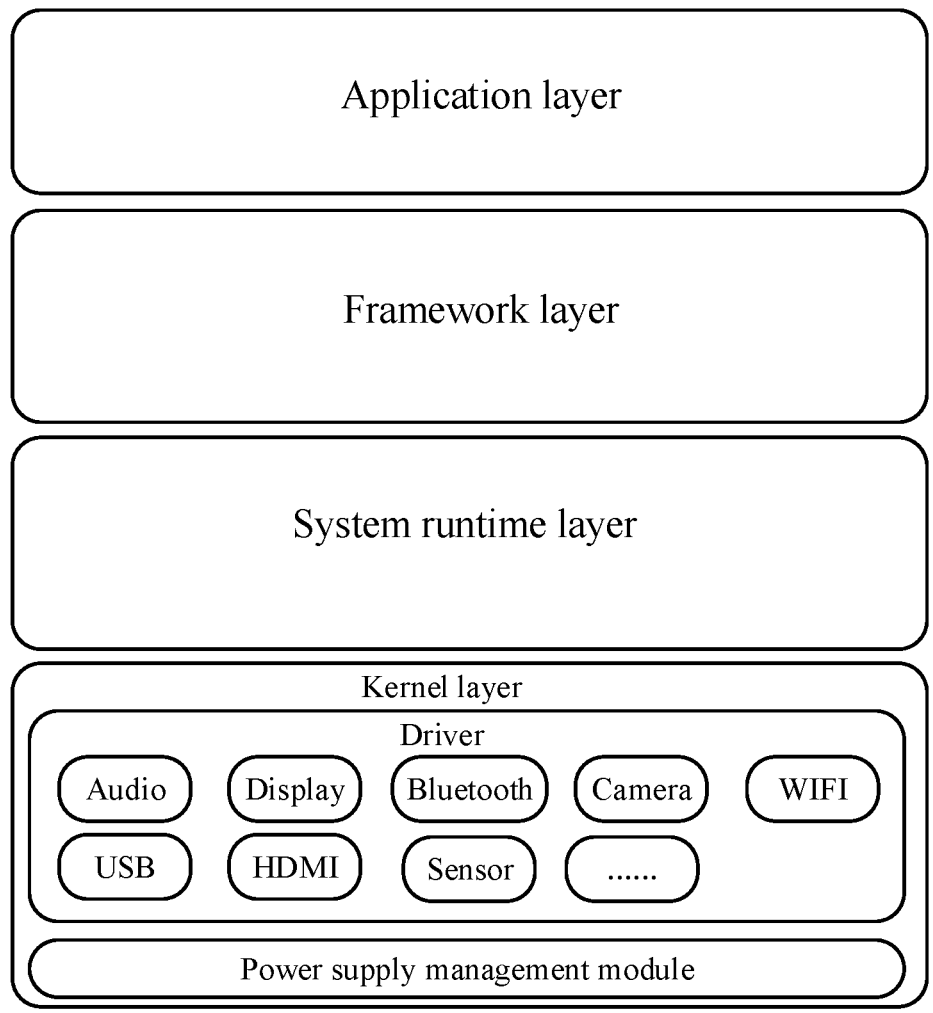
FIG. 4 illustrates a schematic diagram of software configuration of a display apparatus 200 according to one or more embodiments of the disclosure.

FIG. 4 illustrates a schematic diagram of software configuration of a display apparatus 200 according to one or more embodiments of the disclosure. As shown in FIG. 4, a system is divided into four layers, namely, an application layer, an application framework layer ("framework layer" for short), an Android runtime and system library layer ("system runtime layer" for short), and a kernel layer respectively from top to bottom. The kernel layer includes at least one of the following drivers: an audio driver, a display driver, a Bluetooth driver, a camera driver, a WIFI driver, a universal serial bus (USB) driver, a high definition multimedia interface (HDMI) driver, a sensor driver (such as a fingerprint sensor, a temperature sensor and a pressure sensor), and a power driver.

Figure 5:
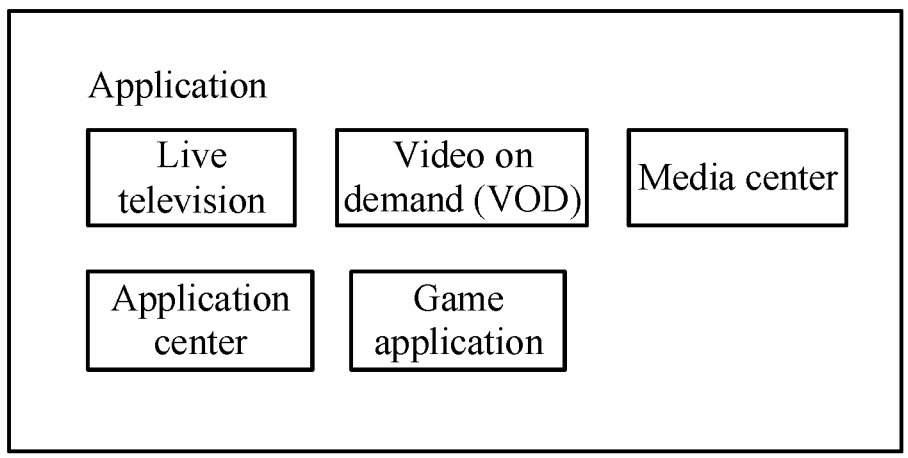
FIG. 5 illustrates a schematic diagram of displaying of an icon interface of an application in a display apparatus 200 according to one or more embodiments of the disclosure.

FIG. 5 illustrates a schematic diagram of displaying of an icon interface of an application in a display apparatus 200 according to one or more embodiments of the disclosure. As shown in FIG. 5, the application layer includes at least one application, and corresponding icons may be presented on the display, such as: a live television application icon, a video on demand (VOD) application icon, a media center application icon, an application center icon and a game application icon. Alive television application may provide live television through different signal sources. A video on demand application may provide videos from different storage sources. Different from the live television application, the video on demand application provides video display from some storage sources. A media center application may provide various applications for playing multimedia contents. An application center may store the various applications.

Figure 6A:
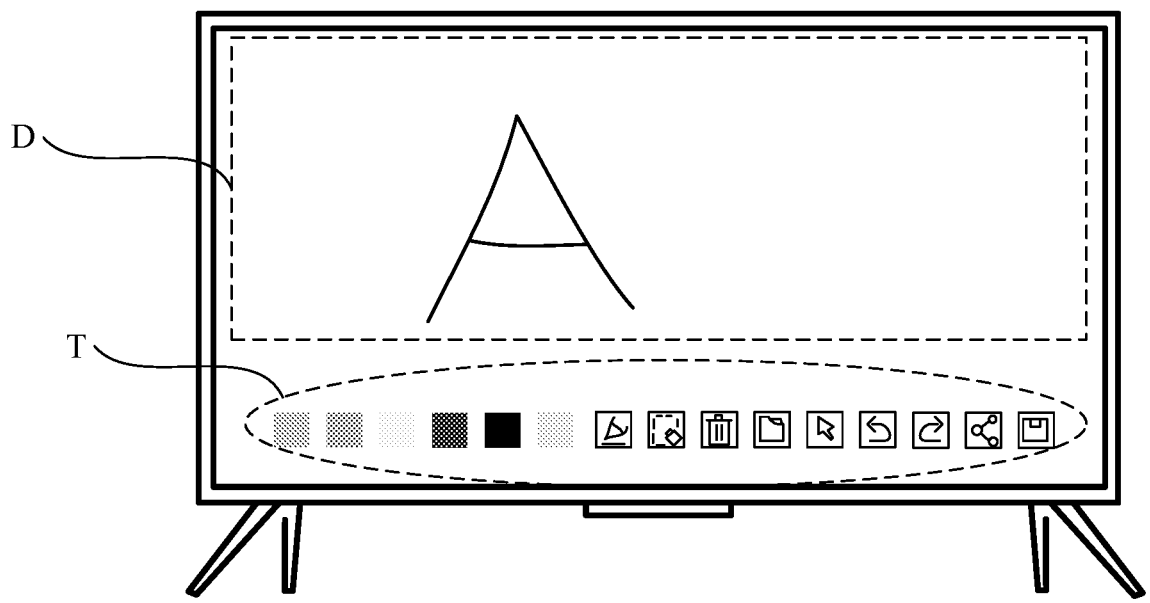
FIG. 6A illustrates a schematic diagram of an interface of an electronic whiteboard application according to one or more embodiments of the disclosure.

In some embodiments, an electronic whiteboard application may be installed in the display apparatus; in an interface of the application, the user may perform operations such as writing and marking; and the display apparatus may generate a touch trajectory according to a touch action from the user, to realize a demonstration or entertainment function of the whiteboard. FIG. 6A illustrates a schematic diagram of an interface of an electronic whiteboard application according to one or more embodiments of the disclosure. Referring to FIG. 6A, the interface of the electronic whiteboard application may be provided with a toolbar region T and a drawing region D, where the toolbar region T may display a plurality of drawing controls, such as a drawing color control, a deleting control, a canceling control and a sharing control; and the drawing region D may be a rectangular region, and the user may draw graphics in the drawing region D. In some embodiments, in the interface of the electronic whiteboard application, the region other than the toolbar region T may be the drawing region D, or the drawing region D may be a small region in an area other than the toolbar region T. In this case, the drawing region D may display a frame, to prompt the user to draw within the frame.

Figure 6B:
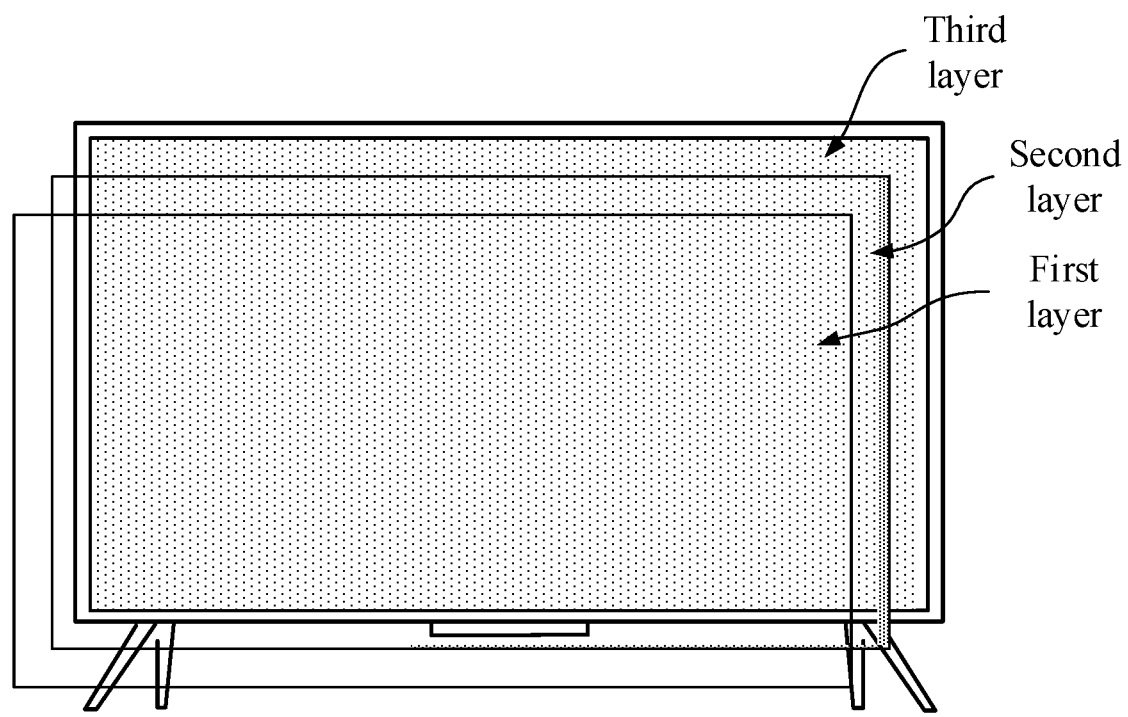
FIG. 6B illustrates a schematic diagram of layer superimposition according to one or more embodiments of the disclosure.

In order to realize a real-time display effect, a display apparatus 200 may display a drawing process by superimposing a plurality of layers. In general, the display apparatus 200 may use one layer to display a sliding touch action trajectory corresponding to the user's manual drawing in real time, and another layer to display a demonstration whiteboard interface; and an image presented on a display 260 finally is formed by superimposing the two layers. In order to facilitate description, in the embodiments of the disclosure, the layer for displaying a touch trajectory pattern in real time is referred to as a first layer, and the layer for displaying the whiteboard interface is referred to as a second layer. Obviously, in order to present the final image, the display apparatus 200 presents not only the above two layers, but also other layers, to display different image contents. FIG. 6B illustrates a schematic diagram of layer superimposition according to one or more embodiments of the disclosure. As shown in FIG. 6B, the display apparatus 200 may include three layers, namely a first layer: group of pictures (GOP) layer, a second layer: on-screen display (OSD) layer, and a third layer: a video layer. The GOP layer is also referred to as a GOP2 layer or an acceleration layer, and the GOP layer may be configured to display temporarily drawn content which are displayed on an upper layer of a menu. The OSD layer is also referred to as a middle layer or a menu layer, which is configured to display an application interface, an application menu, a toolbar and other contents. The video layer is also referred to as a bottom layer, which may be generally configured to display image content corresponding to external signals connected with a television.

In some embodiments, a hierarchical relation may be arranged between different layers, to achieve a specific display effect. For example, the hierarchical relation of the GOP layer, the OSD layer and the video layer may be sequentially: GOP layer-OSD layer-video layer, that is, the video layer is displayed at the bottom to display image contents from external signals; the OSD layer is displayed above the video layer, so that the application menu may float above the external signal image for displaying; and the GOP layer is displayed above the OSD layer, to highlight and display a draw graphic input from the user.

For the GOP layer, because it is configured to display the temporarily drawn contents, the picture displayed in the GOP layer may be presented as different contents according to the input of the user's drawing action. Therefore, in practical applications, in order to meet the drawing requirements, after the input of one sliding touch action is completed, the display apparatus 200 may update the drawn pattern to the OSD layer for displaying, and continue to display other touch trajectory contents through the GOP layer. In such a display mode, a pattern generated by a new drawing action can cover a pattern generated by a previous drawing action, to adapt to operation habits of the user.

It is noted that, for the patterns in the plurality of layers presented by the display apparatus 200, the patterns may be in a form of ARGB, that is, based on the red, green and blue channels, the alpha channel is added as a color component for representing the degree of transparency (or opacity) of a color (i.e., the red, green and blue channels), which is helpful to superimposition of multiple picture layers. For example, for a picture drawn by a user, a portion of paintbrush drawing is a specific touch trajectory pattern, and the other portion is a completely transparent pattern, to prevent the other portion not drawn by the user from blocking the content in the bottom layer. Therefore, based on the above multiple layers, the display apparatus 200 may present the final picture according to the specific pattern content and the transparency in each layer.

Drawing an Ellipse.

Figure 7A:
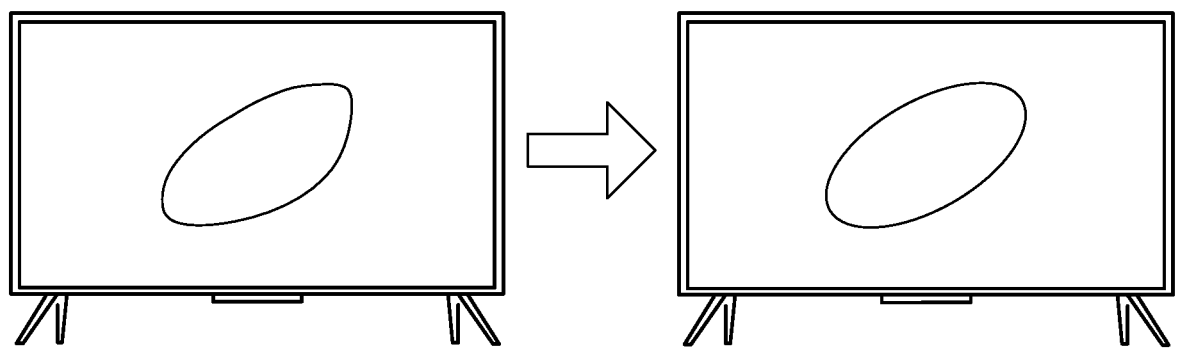
FIGS. 7A-7B illustrate schematic diagrams of drawing a geometric figure according to one or more embodiments of the disclosure.
Figure 7B:
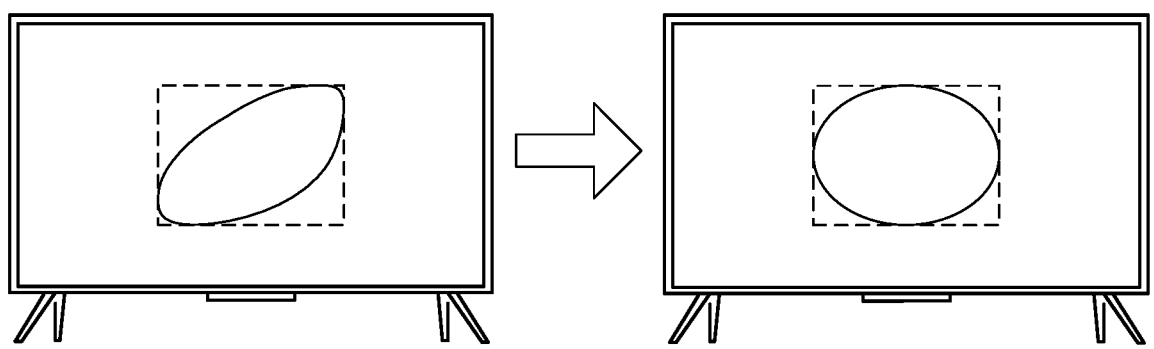

In some embodiments, FIGS. 7A-7B illustrate schematic diagrams of drawing a geometric figure according to one or more embodiments of the disclosure. Recognizing a geometric figure refers to a process that a display apparatus 200 recognizes a standard geometric figure similar to a manual drawing pattern through graphic analysis of the pattern drawn by a user, as shown in FIG. 7A. The pattern drawn by the user may be completed by touching the screen, or by other input devices 500, such as a mouse, an electronic board and a handle. A manual drawing pattern trajectory may be generated in a specified interface by user's input actions, and then the display apparatus 200 recognizes the input pattern trajectory, to determine the standard geometric figure similar to the pattern trajectory.

In order to recognize the standard geometric figure, the display apparatus 200 may realize input of the manual drawing pattern trajectory and recognition of the geometric figure by running a particular application. The standard geometric figure is a series of graphic types determined according to a preset recognition rule, including but not limited to a polygon, a circle, an ellipse, etc. Different recognition frequencies and tolerance ranges may be set for different types of geometric figures according to different needs. In some embodiments, the recognition frequency may be sequentially set as "polygon>circle>ellipse", that is, when a pattern trajectory input from the user is close to both the polygon and ellipse, the polygon is determined as a recognition result.

The recognition of a standard graphic may be implemented through the following: a standard geometric type corresponding to the pattern trajectory input from the user may be determined by analyzing features of the pattern trajectory, and then standard geometry parameters are determined according to some parameters in the pattern trajectory input from the user, to generate a standard geometric figure based on the corresponding parameters. For example, when the pattern trajectory input from the user presents arc transition at multiple points, and a radian change of the arc is within a certain threshold range, it may recognized that the pattern trajectory input from the user may be a circle; and then a distance between a graphic center and each manual drawing point in the pattern trajectory is measured, an average distance value is calculated to obtain a diameter of the circle, and a standard circle is generated according to the diameter.

Obviously, the pattern trajectory may include multiple manual drawing points, and each point may correspond to a unique position coordinate according to its position in the interface. A relative position relation among the manual drawing points may be determined according to the position coordinates. For example, a relative distance between two manual drawing points may be calculated through the position coordinates; and an azimuth relation between two manual drawing points is determined by comparing position coordinate values. Whether the manual drawing points are in a continuous state within a certain region may further be determined through the azimuth relation among the plurality of manual drawing points; and a radian, an angle and other feature information of the continuous state can be further determined.

Different types of standard geometric figures have different pieces of feature information. For example, the polygon has multiple vertices, and the manual drawing points at the vertices are presented as corner shapes; the radian changes of the portions corresponding to the circular pattern trajectory tend to be consistent; and the radian of the ellipse has a corresponding change relation at the corresponding positions of the long axis and the short axis. In practical applications, a feature matching table may be established in the application, and after the user inputs the pattern trajectory, the recognized features in the pattern trajectory are matched with a feature list, so that a standard geometric figure corresponding to a current pattern trajectory is determined.

In order to improve success rate for the recognition of the geometric figures, in practical applications, an auxiliary shape matched with the graphic may further be determined according to a pattern trajectory input from the user, to limit a generation region of the graphic. For example, as shown in FIG. 7B, when an ellipse pattern is recognized, a rectangular region may be determined according to a minimum coordinate value of each manual drawing point corresponding to each direction (x axis and y axis) in the pattern trajectory input from the user, a long side of the rectangular region is taken as a long axis of the ellipse, and a short side of the rectangular region is taken as a short axis of the ellipse. After determining the long axis and the short axis of the ellipse, a standard elliptical pattern may be generated in the rectangular region.

However, this method is applied when the manual drawing graphic of the user is in a positive state. For example, the user should control the long axis of the ellipse to be parallel to a horizontal direction by manual drawing. Obviously, this requirement of the positive state increases the difficulty of user's manual drawing and severely limits an application scenario of graphic recognition. When the user needs to draw a graphic in an inclined state, the difference between the geometric figure recognized through the coordinate values and the graphic that the user desires to input is great, which reduces the recognition accuracy of the geometric figure. For this reason, some embodiments of the disclosure further provide a display apparatus and a method for recognizing a geometric figure, which can be used to detect a trajectory input in a manual drawing demonstration process of the user, to convert the manual drawing action trajectory into a standard geometric figure.

Figure 8:
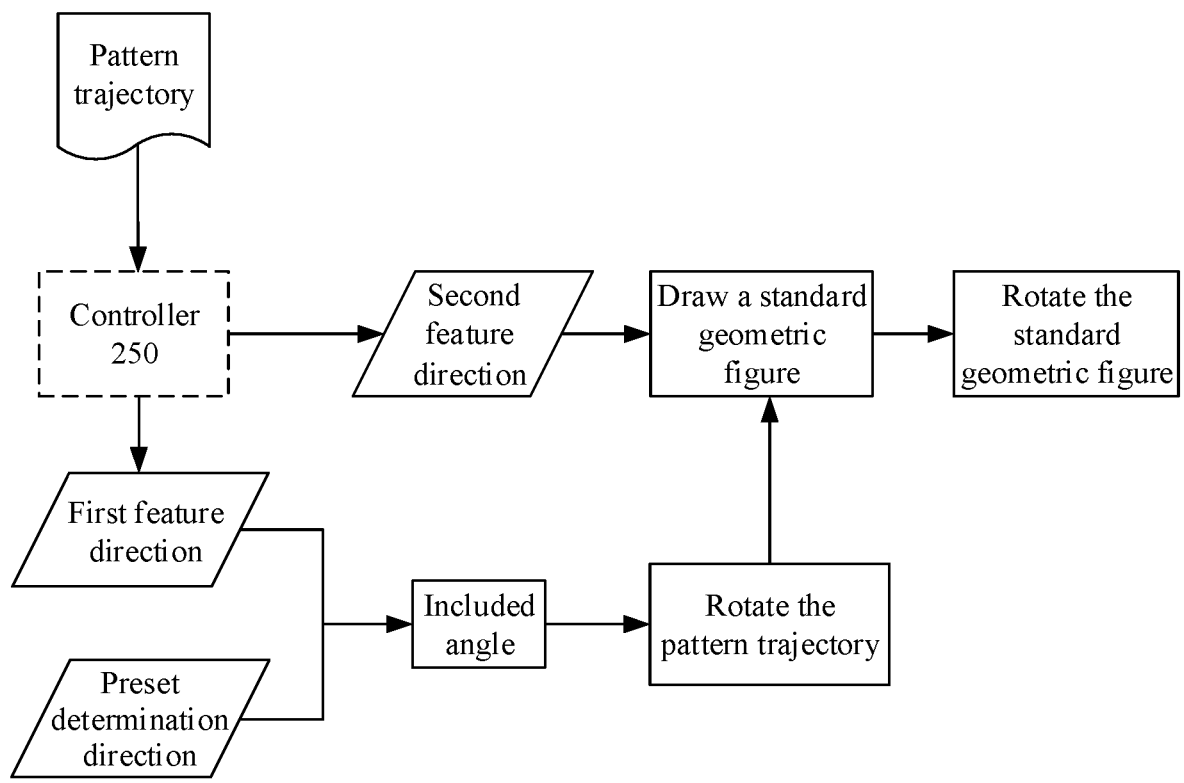
FIG. 8 illustrates a flow chart of recognizing a geometric figure according to one or more embodiments of the disclosure.
Figure 9:
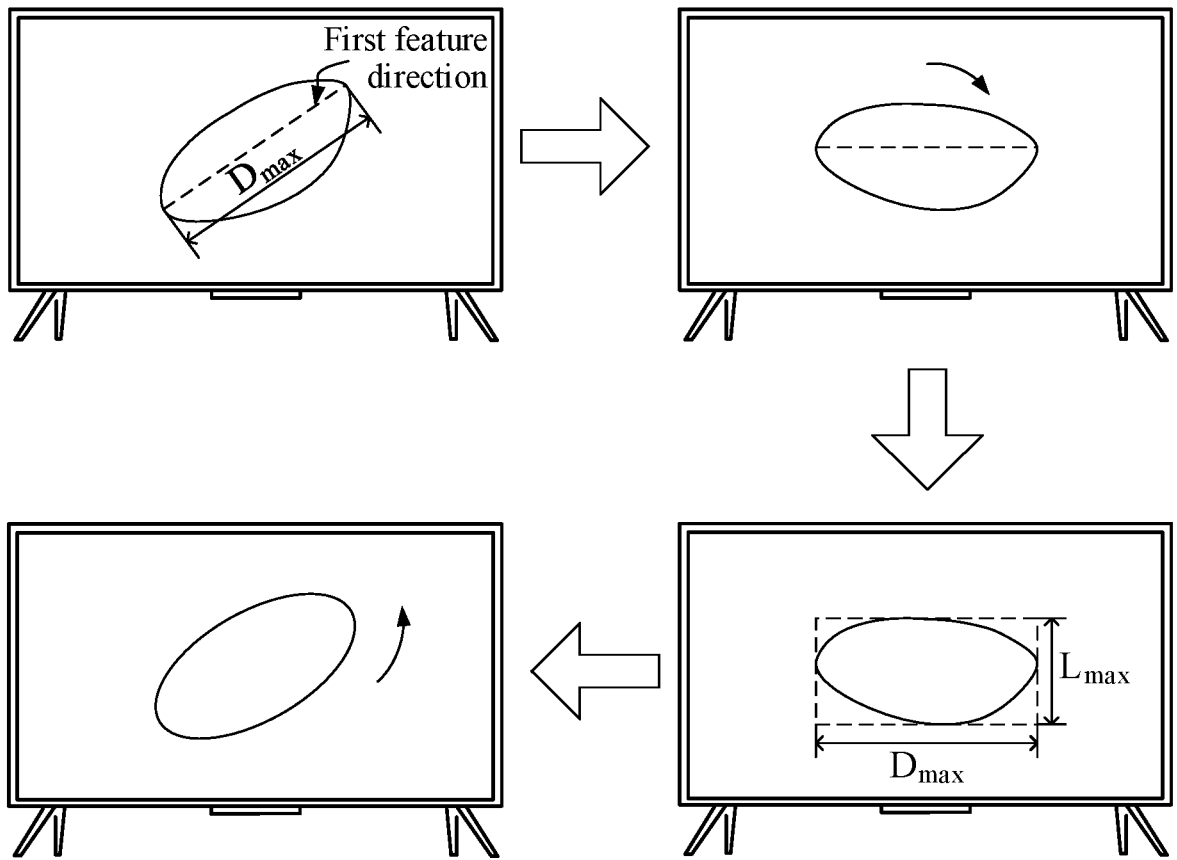
FIG. 9 illustrates a schematic diagram of drawing a geometric figure according to one or more embodiments of the disclosure.

In some embodiments, FIG. 8 illustrates a flow chart of recognizing a geometric figure according to one or more embodiments of the disclosure; and FIG. 9 illustrates a schematic diagram of drawing a geometric figure according to one or more embodiments of the disclosure. As shown in FIG. 8 and FIG. 9, the display apparatus 200 may include a display 275 and a controller 250, the display apparatus 200 is further internally provided or externally connected with an input device 500, and the method includes the following steps.

A pattern trajectory input from a user is obtained.

During geometry recognition, the controller 250 of the display apparatus 200 may obtain the pattern trajectory input from the user via the input device 500. The pattern trajectory is a data set including a plurality of manual drawing point coordinates. For the display apparatus 200, the user may input a drawing action via its built-in touch component or the externally input device 500, the drawing action may generate a voltage change on the touch component or the input device 500, and the voltage change may be detected, transmitted and stored, so that detection of the manual drawing points is realized. The touch component or the input device 500 further converts detected manual drawing point data into input data that may be recognized by the controller 250.

The detection methods of the drawing action from the user are different according to different types of input devices 500. For example, the touch component built in the display apparatus 200 may form a touch screen with the display 275, a touch point position of the user may be detected by the touch component, and thus the pattern trajectory input from the user is detected. For another example, the input device 500 may be a peripheral device such as a mouse. When the user moves the mouse, a cursor on the interface of the display apparatus 200 moves accordingly, at this time, a click event of the mouse is detected, such as pressing a left mouse button and releasing the left mouse button, and a movement position of the cursor in the two click events is detected, so that position data that the cursor passes through is determined, and the pattern trajectory input from the user is detected.

Since a process of inputting a drawing action from the user is a continuous process, the user needs to spend a certain amount of time to complete the input of the pattern trajectory. Generally, for some simple graphics, the input drawing action may be detected according to a start time and an end time of the user drawing once. For example, when the user performs the drawing action through a finger touch operation, when a finger just starts to touch the touch screen, it indicates that the drawing action starts, and when the finger leaves the touch screen, it indicates that the drawing action ends. During a time period when the finger touches the touch screen, coordinates of all position points that the finger passes through may constitute the pattern trajectory input from the user.

Coordinates of manual drawing points in the pattern trajectory are traversed to obtain a first feature direction.

After obtaining the pattern trajectory input from the user, the controller 250 may extract the coordinates of manual drawing points in the pattern trajectory, and determine the first feature direction by analyzing a coordinate change trend and a relative position relation between the coordinates. The first feature direction is a direction of a connecting line between at least two manual drawing points in the pattern trajectory when a position relation between the at least two manual drawing points meets a preset position relation. In some embodiments, in order to recognize a long axis in the ellipse, a distance between any two manual drawing points in the pattern trajectory may be calculated to generate a first distance; then the first distances among all manual drawing points are compared to obtain two manual drawing points with a farthest first distance $D_{max}$; and the two manual drawing points with the farthest first distance are connected by a line to generate the first feature direction according to the direction of the connecting line.

In some other embodiments, the first feature direction may further be determined according to a coordinate change trend among a plurality of manual drawing points. For example, in a process of recognizing a polygon, whether a plurality of continuous manual drawing points constitute vertices of the polygon may be determined according to the coordinate change trend among the plurality of continuous manual drawing points. A specific algorithm may include the following: position coordinates of the plurality of continuous manual drawing points are compared to obtain a coordinate change value of any two adjacent manual drawing points; the coordinate change values corresponding to the plurality of continuous manual drawing points are compared, and if the coordinate change values are within a preset fluctuation error range, it is determined that the manual drawing points from the user are linearly distributed; each side of the polygon is fitted according to the coordinates of the manual drawing points; and a slope and a slope change point of each side are extracted to determine that the slope change points are the vertices of the polygon. Then the first feature direction is determined according to a position relation of the plurality of vertices; for example, for a trapezoid, the direction of two parallel sides may be determined as the first feature direction.

An included angle between the first feature direction and a preset determination direction is detected.

After obtaining the first feature direction, an inclination angle of the user's pattern may be determined according to the included angle between the first feature direction and the preset determination direction. The preset determination direction is a reference direction calibrated according to a drawing interface, which may be a horizontal direction, a vertical direction or other specific inclination angle directions. For example, after the direction of the long axis in the ellipse is set as the first feature direction, an included angle between the direction of the long axis and the horizontal direction may be determined by detection, so that an inclination angle of a manual drawing elliptical pattern is determined. Similarly, for a polygon such as the trapezoid, after a bottom side is taken as the first feature direction, an included angle between the bottom side and the horizontal direction may be detected, so that an inclination angle of a manual drawing trapezoid is determined.

The pattern trajectory is rotated according to the included angle, so that the first feature direction is parallel to the preset determination direction.

After the included angle between the first feature direction and the preset determination direction is detected, a pattern may be rotated according to the detected included angle, so that the pattern is changed to a positive state. For example, when it is detected that the direction of the long axis of the ellipse differs from the horizontal direction by 30 degrees, the pattern trajectory may be controlled to be rotated by 30 degrees, so that the direction of the long axis is parallel to the horizontal direction. The rotation direction may be determined according to a relative included angle direction, that is, +30 degrees indicates clockwise rotation, and −30 degrees indicates counterclockwise rotation.

An origin of rotation may be determined according to a center position of the pattern, that is, after the pattern trajectory is input from the user, according to coordinate values of the manual drawing points, minimum coordinate values and maximum coordinate values of the manual drawing points in the horizontal and vertical directions are determined, so that coordinates of the center point are determined according to the minimum coordinate values and the maximum coordinate values, that is, the coordinates of the center point are shown in the following formulas 1 and 2:

$$x'=(x_{min}+x_{max})/2 \quad (1)$$

$$y'=(y_{min}+y_{max})/2 \quad (2)$$

where, $x_{min}$ and $y_{min}$ are the minimum coordinate values in an x-axis direction and a y-axis direction respectively; and $x_{max}$ and $y_{max}$ are the maximum coordinate values in the x-axis direction and the y-axis direction respectively.

It is noted that, in some embodiments of the disclosure, while rotating the pattern trajectory, the coordinate of each manual drawing point in the pattern trajectory should also be changed for subsequent determination.

Coordinates of manual drawing points in the rotated pattern trajectory are traversed to obtain a second feature direction.

After rotating the pattern trajectory, the coordinates of manual drawing points in the rotated pattern trajectory may further be traversed again to obtain the second feature direction. The second feature direction is a direction having a preset geometric relation with the first feature direction. The second feature direction may have a specific geometric relation with the first feature direction according to a specific pattern type. For example, the second feature direction may be perpendicular to or parallel to the first feature direction.

In some embodiments, a distance between any two manual drawing points in the pattern trajectory in a direction perpendicular to the first feature direction may be calculated to generate a second distance; then the second distances among all manual drawing points are compared to obtain two manual drawing points corresponding to a farthest second distance $L_{max}$; and the two manual drawing points with the farthest second distance are connected by a line to generate the second feature direction according to the direction of the connecting line. It can be seen that a direction of the short axis of the ellipse may be obtained by determining the second feature direction.

Similarly, in some other embodiments, coordinates of multiple continuous manual drawing points of the pattern trajectory in a direction parallel to the first feature direction may be extracted, the coordinate change values in the direction perpendicular to the first feature direction are compared, and if the coordinate change values are within a preset fluctuation range, a direction of the connecting line of two ends in the multiple continuous manual drawing points is determined as the second feature direction. It can be seen that positions of two parallel sides in the trapezoid or a parallelogram may be determined through a parallel relation between the second feature direction and the first feature direction.

A standard geometric figure is drawn according to the first feature direction and the second feature direction.

After determining the first feature direction and the second feature direction, the standard geometric figure may be drawn according to the first feature direction and the second feature direction, as well as a geometry type determined by features of the manual drawing points in the trajectory. In some embodiments, endpoints of the long axis may be located in the first feature direction, and the endpoints of the long axis are two manual drawing points corresponding to the farthest first distance; an external rectangle is generated according to the second distance and the endpoints of the long axis; and a standard geometric figure is generated according to the external rectangle. It can be seen that endpoints of the long axis and the short axis may be determined based on the first feature direction and the second feature direction respectively, the external rectangle is generated, and thus an elliptical shape is determined.

In some other embodiments, endpoints of a long parallel side may be located in the first feature direction, and endpoints of a short parallel side may be located in the second feature direction; and the endpoints of the long parallel side and the short parallel side are taken as the vertices to draw a polygon pattern. It can be seen that positions of two parallel sides of the trapezoid may be determined according to the first feature direction and the second feature direction respectively, two side edges are drawn combined with the corresponding endpoint positions, and thus a trapezoid pattern is drawn.

The standard geometric figure is rotated according to the included angle.

After the standard geometric figure is drawn, the drawn pattern may be rotated according to the included angle between the first feature direction detected previously and the preset determination direction, so that the recognized pattern is restored to the inclined state during drawing, and recognition of the user's manual drawing action is completed.

It can be seen that the method for recognizing a geometric figure discussed in the above embodiments may be configured in the controller 250 of the display apparatus 200, for recognizing the pattern during user's input of the pattern, and convert the pattern into the standard geometric figure, to obtain a better drawing effect. According to the method, the interference of the inclined state of the pattern on graphic parameters may be eliminated by rotating the pattern trajectory, which facilitates matching a pattern recognition template and improves the accuracy of pattern recognition, to improve accuracy compared to low accuracy of a traditional geometry recognition method.

In the above embodiments, by comparing the distance between every two manual drawing points, the first feature direction may be determined according to the direction of the connecting line of the two manual drawing points with the farthest distance. However, in practical applications, the time consumed is long if the distances among all manual drawing points are compared, so that, in some embodiments of the disclosure, the first feature direction may further be obtained by the following manner.

Coordinate extreme values of the manual drawing points in the pattern trajectory are traversed to locate extreme value points.

After obtaining the pattern trajectory, by traversing the coordinates of all manual drawing points in the pattern trajectory, coordinate extreme values may be determined, namely a minimum coordinate value and a maximum coordinate value in the x-axis direction and the y-axis direction. Then an extreme value point including the minimum coordinate value and the maximum coordinate value is located.

For example, by traversing the coordinates of the manual drawing points in the pattern trajectory, it may be determined that the coordinate extreme values in the x-axis direction are respectively $X_{min}$ and $X_{max}$, and the corresponding extreme value points are respectively $P1=(X_{min}, y)$ and $P2=(X_{max}, y)$. Similarly, the coordinate extreme values in the y-axis direction are respectively $Y_{min}$ and $Y_{max}$, and the corresponding extreme value points are respectively $P3=(x, Y_{min})$ and $P4=(x, Y_{max})$. It can be seen that the located extreme value points are four boundary points of the pattern trajectory.

Endpoints are located according to the coordinate extreme values.

After obtaining the coordinate extreme values, by combining the minimum coordinate values and the maximum coordinate values in the x-axis direction and the y-axis direction, coordinates of the endpoints may be obtained. For example, according to the coordinate extreme values $X_{min}$ and $X_{max}$ in the x-axis direction, and the coordinate extreme values $Y_{min}$ and $Y_{max}$ in the y-axis direction, four endpoint coordinates may be determined, namely $P5=(X_{min}, Y_{min})$, $P6=(X_{min}, Y_{max})$, $P7=(X_{max}, Y_{min})$ and $P8=(X_{max}, Y_{max})$.

Third distances between the extreme value points and the endpoints are calculated.

After obtaining the endpoint coordinates, distances between the endpoints and the extreme value points may be calculated according to the endpoint coordinates and the extreme value point coordinates. For example, a distance L51 between the endpoint P5 and the extreme value point P1 is that $L51=y-Y_{min}$; a distance L53 between the endpoint P5 and the extreme value point P3 is that $L53=x-X_{min}$; and the distances between the endpoints and the extreme value points are sequentially calculated, to obtain 8 third distances.

The third distances are compared to obtain two endpoints closest to the extreme value points.

Figure 10:
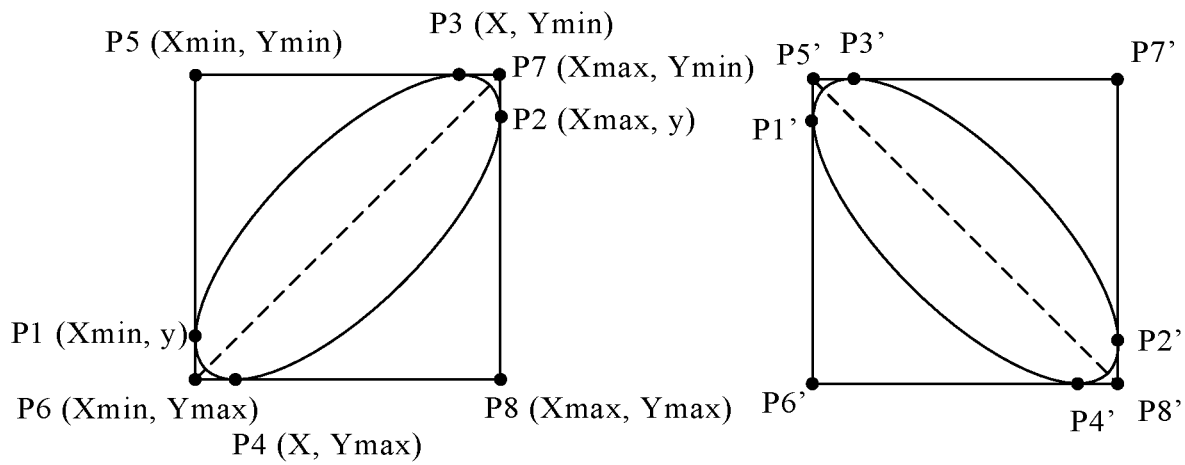
FIG. 10 illustrates a schematic diagram of extreme value points according to one or more embodiments of the disclosure.

After calculating the third distances, the third distances may be compared, and the two endpoints closest to the extreme value points are determined. For example, FIG. 10 illustrates a schematic diagram of an extreme value point according to one or more embodiments of the disclosure. As shown in FIG. 10, in a left figure, the endpoints P6 and P7 are closer to the extreme value points than the endpoints P5 and P8, therefore, it is determined that the two endpoints closest to the extreme value points are the endpoints P6 and P7; and in a right figure, the endpoints P5' and P8' are closer to the extreme value points than the endpoints P6' and P7', and therefore, it is determined that the two endpoints closest to the extreme value points are the endpoints P5' and P8'.

The two endpoints closest to the extreme value points are connected by a line to generate the first feature direction according to the direction of the connecting line.

After determining the two endpoints closest to the extreme value points, the first feature direction may be determined through connecting the two endpoints by the line, and subsequent steps such as detecting the included angle between the first feature direction and the preset determination direction are performed to finally determine the standard geometric figure.

It can be seen that in the embodiments, the first feature direction may be determined through less times of distance comparison between the endpoints and the extreme value points, which greatly shortens the time spent in determining the first feature direction and increases the real-time response speed of the demonstration process.

In some embodiments of the disclosure, in order to determine the relative position relation between the first feature direction and the second feature direction, during obtaining the pattern trajectory from the user, the method further includes:

traversing the manual drawing points in the pattern trajectory to determine a coordinate change trend of the manual drawing points; if the coordinate change trend is the same as a preset shape trend, traversing the coordinates of manual drawing points in the pattern trajectory to obtain the first feature direction; and if the coordinate change trend is different from the preset shape trend, controlling the display to display the pattern trajectory.

In some embodiments of the disclosure, by calculating the coordinates of the manual drawing points in the pattern trajectory, the coordinate change trend among the manual drawing points may be determined. In order to traverse the coordinate change trends, a feature recognition model may be built in a drawing application. A plurality of feature labels may be built in the recognition model, after the pattern trajectory is input into the model, a classification probability of a current pattern trajectory relative to the feature labels may be input, so that whether the coordinate change trend is the same as the preset shape trend is determined.

When the coordinate change trend is the same as the preset shape trend, it is determined that the pattern input from the user is the standard geometric figure that can be recognized, therefore, the coordinates of manual drawing points in the pattern trajectory may be traversed to obtain the first feature direction, and the recognition of the pattern is completed according to the recognition method in the above embodiments. When the coordinate change trend is different from the preset shape trend, it is determined that the pattern input from the user may be a more complex pattern, such as writing text. Therefore, the display may be controlled to display the pattern trajectory in real time, to ensure a normal demonstration effect.

It can be seen that in some embodiments of the disclosure, by traversing the coordinate change trends of the manual drawing points in the pattern trajectory, it can be realized that in the normal demonstration process, the pattern trajectory input from the user is detected in real time; when the preset shape trend is met, geometry recognition is performed, and when the preset shape trend is not met, the pattern drawn by the user is still displayed. The normal demonstration effect is ensured while a geometry recognition function is realized.

In some scenarios, when the user performs a manual drawing operation, due to the lack of an appropriate reference system, when drawing a geometric figure in a positive state, the pattern cannot be perfectly vertical or horizontal, but appears inclined in some sense. In this case, the recognized pattern may be adjusted to the positive state through an automatic correction program. In some embodiments of the disclosure, rotating the standard geometric figure according to the included angle, further includes:

comparing the included angle with a preset included angle threshold; if the included angle is smaller than or equal to the preset included angle threshold, controlling the display to display the generated standard geometric figure; if the included angle is greater than the preset included angle threshold, rotating the standard geometric figure reversely according to the included angle, where a reverse rotation direction of the standard geometric figure is opposite to the rotation direction of the pattern trajectory; and controlling the display to display the standard geometric figure after reverse rotation.

In order to realize automatic correction of the pattern, after drawing the standard geometric figure, the inclined state of the geometric figure may be detected, that is, the inclined state is determined by comparing the included angle between the first feature direction and the preset determination direction with the preset included angle threshold.

When an inclined angle is small, that is, the included angle is smaller than or equal to the preset included angle threshold, the generated standard geometric figure may be directly displayed, so that the generated standard geometric figure is positively displayed. When the inclined angle is large, that is, the included angle is greater than the preset included angle threshold, it is determined that the pattern itself drawn by the user is in the inclined state, therefore, the standard geometric figure may be rotated reversely according to the included angle. Obviously, the reverse rotation direction of the standard geometric figure is opposite to the rotation direction of the pattern trajectory.

It is noted that, the positive state in some embodiments of the disclosure may include a positive state relative to the horizontal direction and a positive state relative to the vertical direction. Therefore, in practical applications, an included angle between the first feature direction and the horizontal direction and an included angle between the first feature direction and the vertical direction may be detected respectively, and then the smaller included angle is compared with the preset included angle threshold, so that whether the drawn pattern is in the positive state is determined.

For example, if the user draws an ellipse, an angle between a long axis of the ellipse and the horizontal direction or the vertical direction is determined. When the angle between the long axis and the horizontal direction is smaller than a certain threshold (such as 15 degrees), the recognized ellipse is adjusted to cause the long axis to be parallel to the horizontal direction; and when the angle between the long axis and the vertical direction is smaller than a certain threshold (such as 15 degrees), the recognized ellipse is adjusted to cause the long axis to be parallel to the vertical direction.

For another example, if a polygon is recognized, such as a rectangle, a parallelogram and a trapezoid, an included angle between a parallel side and the horizontal direction or the vertical direction is determined, when the included angle between the parallel side and the horizontal direction is smaller than a certain threshold (for example, 15 degrees), the recognized polygon is adjusted to cause the parallel side to be parallel to the horizontal direction, and when the included angle between the parallel side and the vertical direction is smaller than a certain threshold (for example, 15 degrees), the recognized polygon is adjusted to cause the parallel side to be parallel to the vertical direction.

Obviously, the above automatic adjusting process may be performed or stopped according to actual needs. In some embodiments of the disclosure, before comparing the included angle with the preset included angle threshold, the method further includes:

detecting an on-off state of an automatic angle adjustment switch;

if the on-off state of the automatic angle adjustment switch is on, comparing the included angle with the preset included angle threshold; and if the on-off state of the automatic angle adjustment switch is off, rotating the standard geometric figure reversely according to the included angle.

In some embodiments of the disclosure, the automatic angle adjustment switch function may be realized through a specific interactive UI element or a specific setting program in the application. For example, a switch button may be displayed in a drawing interface or a setting interface to indicate the on-off state of the automatic angle adjustment function. The user may adjust the on-off state of the automatic angle adjustment switch by clicking, sliding, checking and other actions.

For example, a geometry automatic angle adjustment switch may be added on the pattern drawing interface; if the user turns on the switch, the pattern angle may be automatically adjusted when recognizing the geometric figure; and if the user turns off the switch, automatic angle adjustment will no longer be performed.

In some embodiments of the disclosure, in order to present a better demonstration effect, the geometry recognition method may further include:

obtaining an instruction for creating a pattern trajectory from the user;

in response to the instruction, controlling the display to display the pattern trajectory in real time; and controlling the display to cancel displaying of the pattern trajectory, and display the standard geometric figure after rotating a standard geometric figure according to the included angle.

In practical applications, the display apparatus 200 may show the pattern trajectory in real time according to the instruction from the user. In addition, after recognizing the standard geometric figure, displaying of the pattern trajectory is canceled, and the standard geometric figure is displayed at the corresponding position, to adapt to the input of the pattern from the user.

Figure 11:
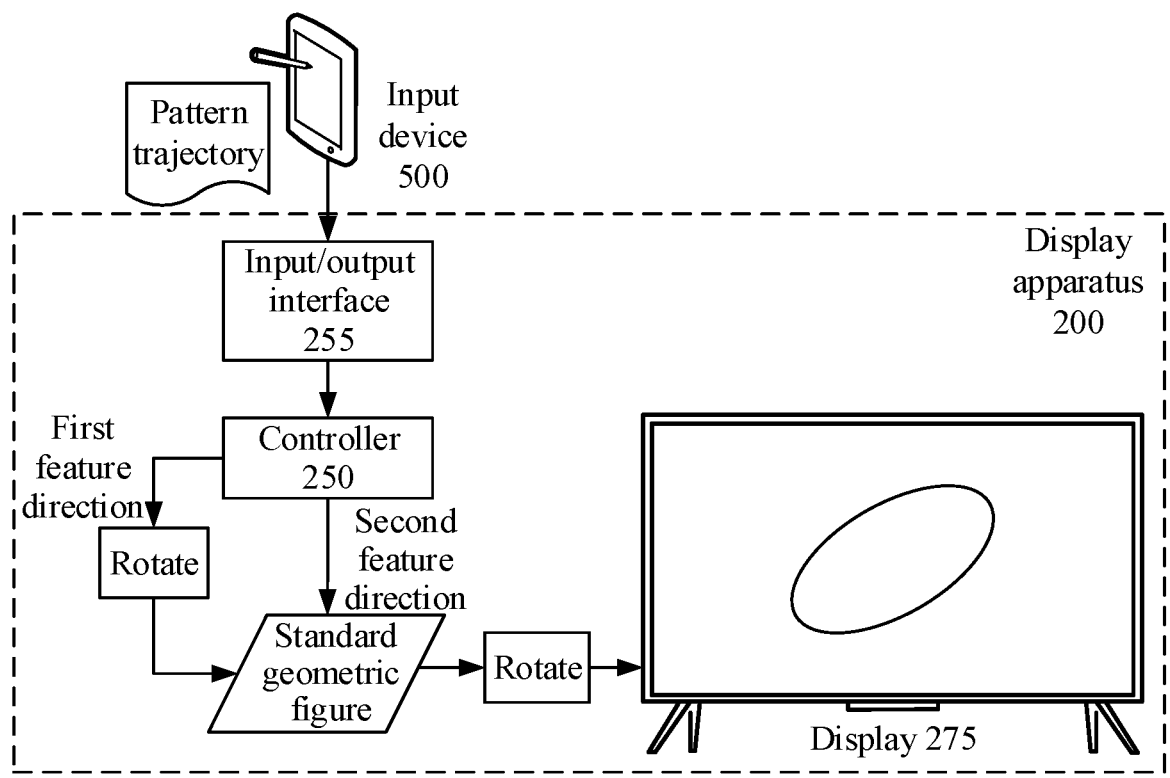
FIGS. 11-12 illustrate flow charts of recognizing geometric figures according to one or more embodiments of the disclosure.
Figure 12:
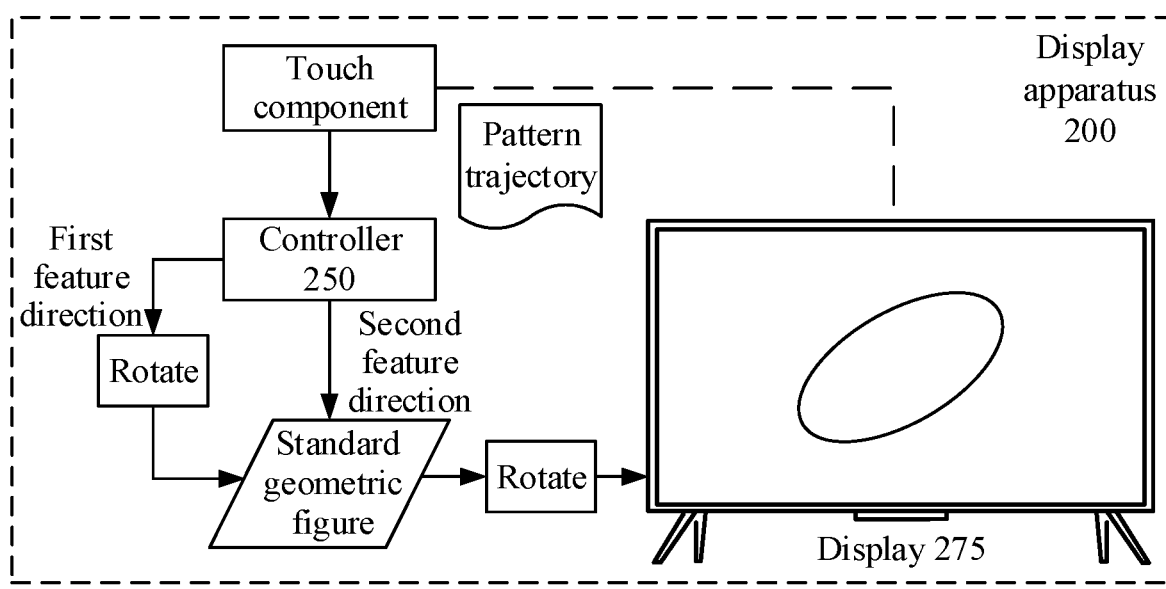

Based on the above geometry recognition method, FIGS. 11-12 illustrate flow charts of recognizing geometric figures according to one or more embodiments of the disclosure. As shown in FIG. 11, a display apparatus 200 is provided in some embodiments of the disclosure, and includes a display 275, an input/output interface 255 and a controller 250. The display 275 is configured to display a user interface; the input/output interface 255 is configured to connect with an input device 500; and the controller 250 is configured to perform:

obtaining a pattern trajectory input from a user via the input/output interface 255; and generating a standard geometric figure according to the pattern trajectory; where the standard geometric figure has the same inclination angle as the pattern trajectory; and the standard geometric figure is generated after reverse rotation based on the pattern trajectory.

It can be seen that, the display apparatus 200 according to the embodiments may be connected with the input device 500 through the input/output interface 255, and the user may have interaction through the input device 500, and input the pattern trajectory, so that the controller 250 may generate a standard geometric figure according to the pattern trajectory. Specifically, the controller 250 determines a first feature direction by traversing the coordinates of manual drawing points in the pattern trajectory, and rotates the pattern trajectory according to an included angle between the first feature direction and a preset determination direction, to determine a second feature direction; then a standard geometric figure is drawn according to the first feature direction and the second feature direction; and finally, the standard geometric figure is adapted to the pattern position by rotating. According to the display apparatus, the interference of the inclined state of the pattern on pattern parameters may be eliminated by rotating the pattern trajectory, which improves the accuracy of pattern recognition, to solve the problem of low accuracy of a traditional geometry recognition method.

As shown in FIG. 12, in some embodiments, a display apparatus 200 is further provided, and includes a display 275, a touch component and a controller. The display 275 is configured to display a user interface; the touch component is configured to obtain touch input from a user; and the controller 250 is configured to perform:

obtaining a pattern trajectory input from the user via the touch component; and generating a standard geometric figure according to the pattern trajectory; where the standard geometric figure has the same inclination angle as the pattern trajectory; and the standard geometric figure is generated after reverse rotation based on the pattern trajectory.

It can be seen that, the display apparatus 200 according to the embodiments may realize the detection of the user input through the built-in touch component, to obtain the pattern trajectory from the user. The controller generates the standard geometric figure according to the pattern trajectory, that is, the controller determines a first feature direction according to the input pattern trajectory and determines a second feature direction after performing rotation, to draw the standard geometric figure according to the first feature direction and the second feature direction. According to the display apparatus 200, the built-in touch component may be matched with the display 275 to form a touch screen, which facilitates the user input. In addition, by rotating the pattern, the influence of the inclined state on the graphic recognition process is alleviated, and the accuracy of pattern recognition is improved.

Superimposition of Layers.

Figure 13:
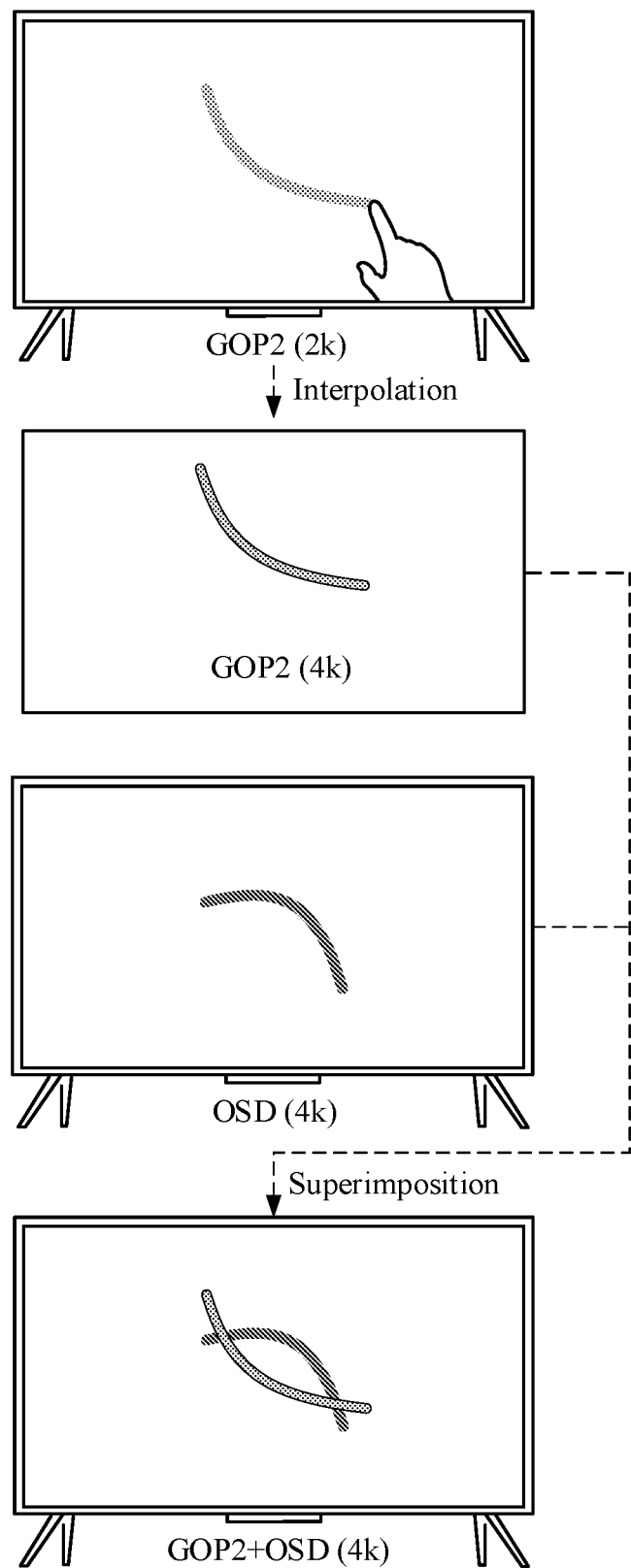
FIGS. 13-15 illustrate schematic diagrams of multi-layer superimposition according to one or more embodiments of the disclosure.
Figure 14:
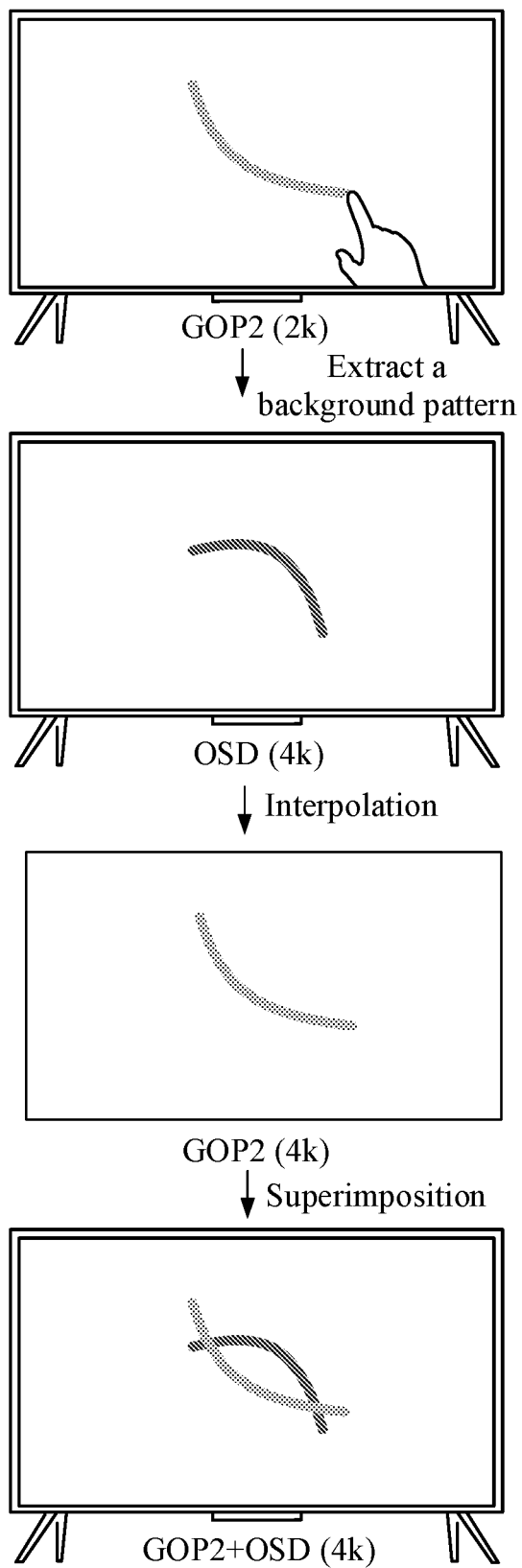
Figure 15:
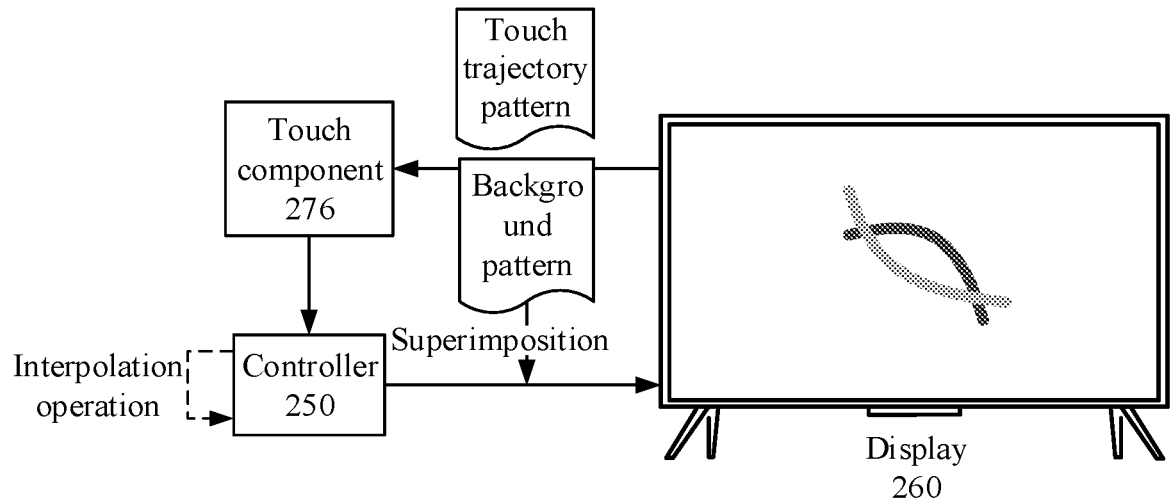

In some embodiments, since each layer on the display of the display apparatus is configured to display different contents, patterns in layers may have different picture resolutions. For example, a resolution of the GOP layer is 2k, while resolutions of the OSD layer and the video layer are 4k, and when pictures are superimposed, the patterns in layers may be hardly aligned due to different resolutions, resulting in poor display effect or error. In order to display those layers, when there is a resolution difference between different layers, an interpolation operation may be performed on the patterns in a layer with a lower resolution, to improve the resolution of the pictures in this layer. For example, FIGS. 13-15 illustrate schematic diagrams of multi-layer superimposition according to one or more embodiments of the disclosure. As shown in FIG. 13, when the GOP2 layer, the OSD layer and the video layer are superimposed, since the resolution of the GOP2 layer is 2K, and the resolutions of the OSD layer and the video layer are 4K, the GOP2 layer needs to be adjusted to the resolution of 4K through an interpolation algorithm before being superimposed with the other two layers.

The interpolation operation is an interpolation algorithm of image pictures, which may calculate contents of pixels to be inserted according to contents of multiple adjacent pixels in an image, to improve the resolution of the pictures. However, since the superimposed layers include transparency information, and different layers are often set with different transparencies, the contents of the adjacent pixels may be affected by the transparency when the interpolation algorithm is performed, which causes display error in an edge area of a drawn pattern after the interpolation algorithm.

Taking an electronic whiteboard application in the display apparatus 200 as an example, a writing process of an electronic whiteboard is generally displayed in the GOP layer, lines after writing are displayed in the OSD layer, and the electronic whiteboard interface displays the superimposition of the GOP layer and the OSD layer. During superimposition, if the resolutions of the layers are different, the patterns with a lower resolution are generally magnified to a higher resolution by interpolation, and then superimposed. When the GOP2 layer (2K) is to be superimposed with the OSD layer (4K), it is necessary to first adjust the resolution of GOP2 layer to 4K, in this case, the interpolation algorithm needs to be performed on pixels, and if the background of the GOP2 layer is transparent (that is, the background color is 0X00000000), the interpolation algorithm may be performed on the line color and the transparent color at the boundary of the lines. Since the transparent color does not work in the interpolation algorithm, aliasing issue may occur due to switching from 2K to 4K via interpolation, if a color value of the transparent color is determined as 000000, the interpolation algorithm is performed on the line color and transparent black, and a case of translucent black may occur after interpolation, which may show black edges at the boundaries of the lines.

In order to address display error of the above touch trajectory pattern edge, in some embodiments of the disclosure, a method for multi-layer superimposed display is provided; the method may be applied to a display apparatus 200; the display apparatus 200 includes a display 260, a touch component 276 and a controller 250; and the touch component 276 is configured to detect a touch trajectory from a user. As shown in FIG. 14 and FIG. 15, the method for multi-layer superimposed display includes the following steps.

A touch trajectory pattern in a first layer is obtained, and a background pattern in a second layer is obtained. The first layer is configured to show the touch trajectory pattern, and the second layer is configured to show an application interface, an application menu, a toolbar and other interface elements. Therefore, the second layer is a layer located below the first layer. For example, the first layer is a GOP2 layer, and the second layer is an OSD layer.

The user may start relevant applications by clicking application icons in an application launch interface. If the application started by the user is an application that can use the first layer, the application interface may be displayed in the second layer. At the same time, the touch trajectory from the user is detected in real time via the touch component 276, and the touch trajectory pattern is presented in the first layer according to an input action from the user. In the embodiments of the disclosure, the contents shown in the second layer not only include the application interface, the application menu, the toolbar and other application contents, but also include drawing contents synchronized to the second layer after one touch action. Therefore, for the convenience of description, the application interface content presented in the second layer is referred to as the background pattern.

After obtaining the touch trajectory pattern in the first layer and the background pattern in the second layer, the controller 250 may further perform the interpolation algorithm on the touch trajectory pattern according to the background pattern, to convert the touch trajectory pattern into a converted pattern whose resolution is equal to the resolution of the background pattern.

The interpolation algorithm is used to change the resolution of the touch trajectory pattern, and according to different effect requirements of a processed image, the interpolation algorithm may adopt different forms, such as a nearest neighbor interpolation, a bilinear interpolation, a bicubic interpolation and a directional interpolation. Taking the neighbor interpolation as an example, when it is necessary to transform a 2k image into a 4k image, values of pixels in the 2k image may be traversed, and an average value of pixel values of two adjacent pixels is calculated, to obtain a pixel value corresponding to a pixel to be inserted. That is, when the two adjacent pixels are respectively (0, 255, 0) and (255, 255, 255), calculation may be performed respectively for values in an RGB channel, that is, a value of a pixel inserted into an R channel is (0+255)/2=128, a value of a pixel inserted into a G channel is (255+255)/2=255, and a value of a pixel inserted into a B channel is (0+255)/2=128.

When the interpolation algorithm is performed, image data of the pixels may be extracted from an edge of the touch trajectory pattern and a close position of the background pattern respectively, so that image data of the interpolated pixels is calculated according to the pixel data extracted from the background pattern and the touch trajectory pattern.

For example, after obtaining the touch trajectory pattern, color of the touch trajectory pattern may be extracted to obtain the image data (192, 0, 255, 0), that is, the user draws a pure green pattern with 75% opacity in a manual drawing manner. Meanwhile, the color is extracted in the background pattern to obtain the image data (255, 255, 255, 255) of the background pattern, that is, the background pattern is a pure white interface. Therefore, according to the above extracted image data, the data of the interpolated pixels may be calculated as that: a transparency channel value is maintained as 192 (namely 75% opacity), the value of the pixel inserted into the R channel is (0+255)/2=128, the value of the pixel inserted into the G channel is (255+255)/2=255, and the value of the pixel inserted into the B channel is (0+255)/2=128, that is, the interpolated pixel is (192, 128, 255, 128). When the interpolation algorithm is performed to increase the resolution, the pixel of (192, 128, 255, 128) is inserted into the edge of the touch trajectory pattern.

The converted pattern and the background pattern are superimposed to control the display to present a superimposition result in real time.

After the interpolation operation is performed on the touch trajectory pattern, the controller 250 may further perform superimposition according to the result of the interpolation operation and the background pattern, and display the superimposition result on the display 260 in real time. It can be seen from the above embodiments, since the calculated interpolated pixel data is determined according to the background pattern and the touch trajectory pattern during the interpolation operation, when the pictures of the two layers are superimposed, no black edge or aliasing will appear at the edge of the touch trajectory pattern, so that the display effect of layer superimposition process is improved.

In the above embodiments, it is necessary to extract pattern data from the first layer and the second layer respectively when the interpolation operation is performed on the touch trajectory pattern. For the picture presented in the first layer, because its pattern is generated by the touch input from the user, the pattern in the first layer may be directly extracted from a touch operation from the user. That is, in some embodiments, the step of obtaining the touch trajectory pattern in the first layer further includes: receiving a touch trajectory from the user in real time; extracting foreground color in response to the touch trajectory; and presenting the touch trajectory in the first layer according to the foreground color to generate the touch trajectory pattern.

After the display apparatus 200 starts running applications such as a demonstration whiteboard application, the user may input the touch trajectory through the touch action; and the touch trajectory may be sent to the controller 250 after the touch component 276 detects the touch trajectory, so that the controller 250 extracts the foreground color in response to the touch trajectory.

In the embodiments of the disclosure, the foreground color is a paintbrush color selected by the user in a drawing demonstration process. For example, the user may select a paintbrush shape and set the foreground color as green in a toolbar window of the demonstration whiteboard application interface. After the user inputs a sliding touch operation subsequently, a green touch trajectory may be formed in the whiteboard interface. Therefore, in order to obtain the pixel data corresponding to the touch trajectory pattern, the controller 250 may directly extract the foreground color and present the touch trajectory in the first layer according to the foreground color, to generate the touch trajectory pattern.

While generating the touch trajectory pattern, the controller 250 may further retain the extracted foreground color as the pixel data corresponding to the touch trajectory pattern. That is, when the interpolation algorithm is performed, the interpolation calculation may be directly performed through data of the foreground color and data of the background color extracted from the second layer.

For example, a transparent color picker may be set in a demonstration whiteboard application in the display apparatus 200, and part of the background color of the GOP layer is set as a color of the transparent color picker, so that a boundary line will not appear after the color of the drawing line and the color of the transparent color picker are interpolated.

For a scenario where the paintbrush color or interface color in the transparent layer is a single color, the transparent color picker selects the paintbrush color or the interface color and sets it to be fully transparent. In this way, the color at the boundary of the line or interface and the transparent layer is a value of the interpolated translucent paintbrush color, and the boundary will not present obvious black or other boundary colors.

However, during some demonstration or drawing processes, the paintbrush used by the user may not be a fixed color, that is, the paintbrush may include multiple color pens, which may be in the form of multiple color combinations with the extension of the touch trajectory. When the user draws by using a color pen, the controller 250 takes the foreground color as the pixel data of the touch trajectory pattern, which may cause the extracted pixel data to be inconsistent with an actual touch trajectory pattern, and affect a calculation result of the interpolation algorithm. Therefore, in some embodiments, according to the background pattern, the step of performing the interpolation operation on the touch trajectory pattern further includes: extracting a boundary color and a boundary position of the touch trajectory pattern firstly; and then extracting a background color of a region associated with the boundary position from the second layer, to determine an interpolation result according to the boundary color and the background color of the region associated with the boundary position, and perform the interpolation operation on the touch trajectory pattern.

The controller 250 may extract the boundary of the touch trajectory pattern by performing an image analysis program in a process of presenting the touch trajectory pattern in the first layer, and obtain the boundary color and positions where boundary pixels are located. The image boundary may be obtained by determining a color value difference between two adjacent pixels by traversing all pixels in the image, and determining the position where the two adjacent pixels are located as the boundary of the touch trajectory pattern when the difference is large. Since the first layer is presented on the top layer, in order to superimpose these layers for display, the corresponding opacity of pixels on the first layer that are not the touch trajectory pattern is 0%, so the boundary of the touch trajectory pattern may be determined according to the opacity.

After obtaining the boundary color and the boundary position, the controller 250 may further extract the background color in the second layer. If the background pattern in the second layer is a pure color background, the background color may be extracted from any pixel in the background pattern; and if the background pattern in the second layer is not a pure color background, it is necessary to search in the second layer according to the boundary position, to determine that the color of the pixels on the background pattern position corresponding to the boundary position is the background color.

Obviously, the boundary of the touch trajectory pattern is a two-dimensional array including a plurality of pixels, so the background color extracted from the background pattern is also the two-dimensional array including a plurality of pixels. The controller 250 then determines the interpolation result according to the boundary color and the background color, and converts the touch trajectory pattern into a converted pattern with the high resolution, so as to perform the superimposition operation for a plurality of layers.

For example, for colorful lines, the colors of the lines are not fixed, if the transparent color picker selects one of the colors, the selected color may still be different at the boundary. For this case, the transparent color picker may select the color of the OSD layer. The color of the lower layer to be superimposed is selected because it may eventually be superimposed together after the resolution is adjusted. If the background color is a single color, the selected color of the transparent color picker is a full transparent value of the single color; and if the background color is a non-single transparent color, the transparent color picker is a two-dimensional array. For a region where the content needs to be shown in the GOP layer, a color array of a position in the OSD layer corresponding to the region is obtained, and then the full transparent value of the color in the color array is taken as the color of the transparent color picker.

The color of the transparent color picker is used as a background color of the content to be shown, during superimposition, because the color in the transparent color picker is a color value of the layer below a boundary region to be superimposed, at this time, the boundary color after interpolation is a translucent value of the color to be superimposed, and there will be no boundary line or abnormal boundary color after superimposition.

It can be seen from the above embodiments that, the pixels at the boundary position may be directly determined through the boundary color and the boundary position of the touch trajectory pattern, in this case, the background color associated with the boundary pixels is determined, the color change of the touch trajectory in the first layer and the color change in the background pattern in the second layer are adapted, so that when the interpolation operation is performed on the boundary of the touch trajectory pattern, an interpolation result adapted to colors of two layers may be obtained, to improve the image quality of the boundary region.

Since in practical applications, the interpolation algorithm is an operation performed only when the layers for superimposition have different resolutions, and when the layers have the same resolution, the interpolation algorithm on the touch trajectory pattern may not be needed. That is, in some embodiments, the step of performing the interpolation operation on the touch trajectory pattern according to the background pattern further includes: detecting resolutions of the touch trajectory pattern and the background pattern; then performing different operations according to a detection result; and if the resolution of the touch trajectory pattern is smaller than the resolution of the background pattern, extracting the boundary color and the boundary position of the touch trajectory pattern; and if the resolution of the touch trajectory pattern is equal to the resolution of the background pattern, performing superimposition on the touch trajectory pattern and the background pattern.

The resolutions of the touch trajectory pattern and the background pattern may be obtained through a screen resolution supported by the display 260 of the display apparatus 200 or a resolution supported by a currently running application. After detecting the resolutions of the touch trajectory pattern and the background pattern, the resolutions of two layers may be compared, and a superimposition mode is determined according to result of the comparison.

When the resolution of the touch trajectory pattern is smaller than the resolution of the background pattern, that is, the resolution of the content displayed in the first layer is smaller than the resolution of the content displayed in the second layer, in this case, the pattern with a small resolution needs to adjust resolution, that is, the interpolation algorithm is performed on the touch trajectory pattern, and the boundary color and the boundary position of the touch trajectory pattern are extracted.

Obviously, when performing the interpolation algorithm, the quantity of the inserted pixels in the interpolation algorithm needs to be further determined according to the resolution of the background pattern. For example, if the GOP layer has 2k resolution, and the OSD layer has 4k resolution, the same quantity of pixels as the touch trajectory pattern needs to be inserted into the touch trajectory pattern in the GOP layer, so that the touch trajectory pattern is also converted into 4k resolution pattern.

When the resolution of the touch trajectory pattern is equal to the resolution of the background pattern, that is, the resolutions of the patterns in the first layer and the second layer are the same, in this case, it may be unnecessary to perform interpolation on the touch trajectory pattern, and superimposition is directly performed on the touch trajectory pattern and the background pattern.

The display apparatus 200 may further display different types of application interfaces through superimposition of layers, that is, a third layer, such as a video layer, further needs to be superimposed in addition to the first layer and the second layer. While the display apparatus 200 displays an external signal content through the video layer, a video program interface is displayed through the OSD layer, and in this case, a demonstration function is completed through the GOP layer. In this scenario, not only the first layer has transparency setting, but also the second layer has transparency setting. When the controller 250 extracts the background pattern in the second layer, a transparent region may be extracted, thereby affecting the interpolation algorithm result and the superimposition result.

Therefore, in some embodiments, the step of displaying the content from the specific external signal and performing the interpolation operation on the touch trajectory pattern according to the background pattern further includes: detecting a transparency of the background pattern, according to a detection result of the transparency, if the transparency of the background pattern is fully transparent or translucent, obtaining a bottom pattern in the third layer, and then performing superimposition on the background pattern and the bottom pattern; and thus the background pattern after superimposition is presented in the second layer.

In order to alleviate the impact of the transparent region in the second layer on the result of the interpolation algorithm, before performing the interpolation algorithm, the transparency of the background pattern may further be detected firstly, to determine whether the background pattern in the second layer is a fully transparent or translucent pattern. The specific detection process may include: traversing opacity values of pixels in the background pattern, if there are pixels or regions with an opacity value of 0 in the background pattern, or a proportion of the pixels with the opacity value of 0 in the total quantity of the pixels is greater than a set value, determining that the transparency of the background pattern is fully transparent or translucent.

When the background pattern is a fully transparent or translucent pattern, it is determined that the interpolation algorithm is affected by the transparent pattern in the second layer, and some or all boundary defects may appear. In this case, the second layer and the third layer may be superimposed first, and then the interpolation operation is performed on the pattern in the first layer. The third layer is a layer below the second layer. For example, when it is detected that the pattern displayed in the OSD layer is a transparent or translucent pattern, the bottom pattern displayed in the video layer may be extracted, the superimposition is performed on the bottom pattern and the background pattern in the second layer, and the influence of the transparent region in the background pattern of the second layer is eliminated, so that a transparent color may not be extracted when the background color is subsequently extracted in the second layer, and the display effect of the touch trajectory boundary is ensured.

Similarly, for superimposition of multiple layers, before performing the interpolation algorithm on the touch trajectory pattern, the resolutions of the second layer and the third layer may further be detected, so that superimposition is performed after the resolutions are adjusted to be consistent. That is, in the step of performing superimposition on the background pattern and the bottom pattern, the resolutions of the background pattern and the bottom pattern may further be detected, if the resolution of the background pattern is smaller than the resolution of the bottom pattern, a bottom color is extracted in the third layer, and the interpolation algorithm is performed on the background pattern according to the bottom color; and superimposition is performed on the background pattern and the bottom pattern after performing interpolation algorithm.

It is noted that, since the third layer as the bottom layer may be configured to display image content from an external signal, the display apparatus 200 may not be able to directly obtain the bottom pattern, so when the color in the bottom pattern is extracted, the video layer may be captured first to obtain a screenshot, and then the bottom color is extracted from the screenshot.

It can be seen from the above embodiments, before performing the interpolation algorithm and superimposition display on the image in the first layer, the background pattern in the second layer may be processed firstly, so an effective background color can always be extracted in the background pattern displayed in the second layer; so that when the interpolation algorithm is performed on the first layer, the interpolation can be performed on the boundary of the touch trajectory pattern, and the boundary display defects are alleviated.

Based on the above embodiments, in a layer superimposition process, the following effects may be obtained: for example, if the OSD layer is an opaque full screen, the OSD layer may completely cover the video layer after superimposition, and from the user's perspective, the contents in the OSD layer and the GOP2 layer are displayed; and if the OSD layer has some transparency, it is the superimposed effect of the GOP2 layer, the OSD layer and the video layer.

In some embodiments of the disclosure, a display apparatus 200 is further provided, and includes a display 260, a touch component 276 and a controller 250. The display 260 is configured to display an image from broadcast system or Internet and/or a user interface; the touch component 276 is configured to detect a touch trajectory input from a user; and the controller 250 is configured to perform:
  obtaining a touch trajectory pattern in a first layer and a background pattern in a second layer, where the second layer is a layer below the first layer;
  performing an interpolation operation on the touch trajectory pattern according to the background pattern to generate a converted pattern whose resolution is equal to a resolution of the background pattern; and
  superimposing the converted pattern and the background pattern to control the display to present a superimposition result of the converted pattern and the background pattern in real time.

The display apparatus 200 according to the above embodiments, after obtaining the touch trajectory pattern, the interpolation operation can also be performed on the touch trajectory pattern in the first layer according to the background pattern in the second layer to adjust the resolution of the touch trajectory pattern. Finally, the converted pattern obtained after the interpolation operation and the background pattern are superimposed and presented in real time on the display. The display apparatus may perform the interpolation operation on the touch trajectory pattern according to the background pattern, which can alleviate the influence of the transparency in the first layer on the interpolation algorithm result at the edge(s) of the touch trajectory pattern, reduce aliasing or black edge when the touch trajectory pattern is superimposed, and improve the real-time display effect.

Rotatable Screen.

In some embodiments, an electronic whiteboard application may be installed on a display apparatus with a touch function, and the display apparatus with the touch function may further have a screen which is able to rotate. The display apparatus may be provided with a base and a rotary bracket, the base of the display apparatus may be fixed to a wall, and a display of the display apparatus may be rotated around the base on a vertical plane through the rotary bracket.

In some embodiments, the display of the display apparatus may have multiple rotation states, such as a first rotation state, a second rotation state and a third rotation state, where the first rotation state may be a landscape state, the second rotation state may be a portrait state, and the third rotation state may be an inclined state, such as the state with an angle of 45 degrees to a horizontal plane. The display apparatus may be rotated from one rotation state to another rotation state.

In some embodiments, the rotation state of the display apparatus may include the first rotation state and the second rotation state only.

In some embodiments, when the display of the display apparatus is rotated, a user may press a preset key on a remote controller to pause the rotation, so that the display apparatus stays at a rotation angle required by the user. Exemplarily, the preset key may be an OK key on a remote controller.

Figure 16:
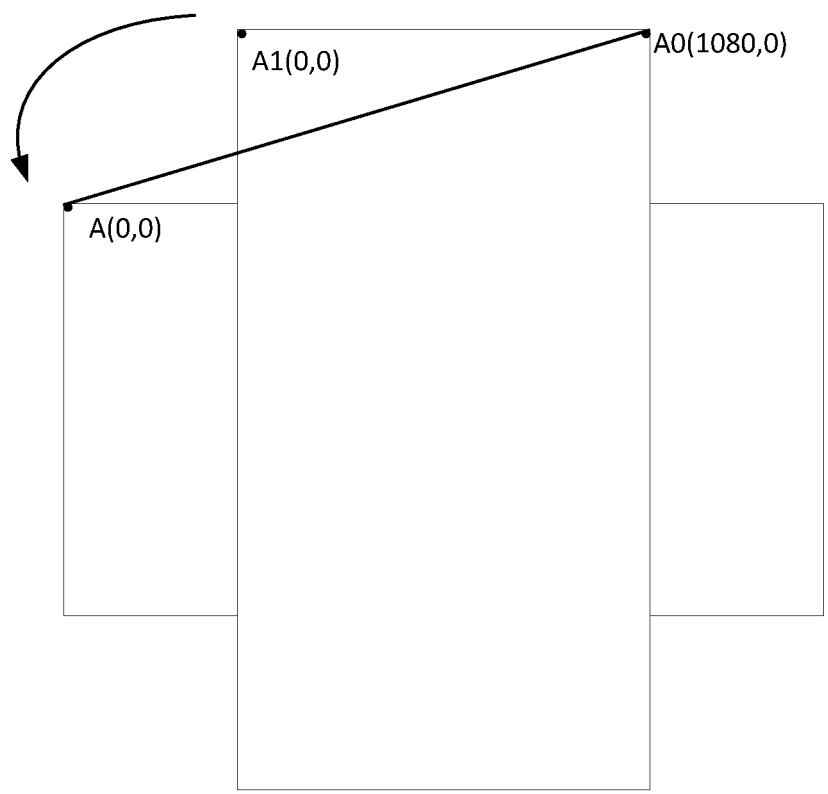
FIG. 16 illustrates a schematic diagram of coordinate system conversion according to one or more embodiments of the disclosure.

However, when the display apparatus is a rotatable television, after the display is rotated, the GOP2 layer may re-establish a coordinate system according to the current rotation state. In some embodiments, FIG. 16 illustrates a schematic diagram of coordinate system conversion according to one or more embodiments of the disclosure. As shown in FIG. 16, a default coordinate system is a coordinate system in the landscape state, and a coordinate origin is A (0, 0) in the default coordinate system. After the display is rotated to the portrait state, a new coordinate system is a coordinate system in the portrait state, in the new coordinate system, a coordinate origin is A1 (0, 0), and coordinates of the original coordinate origin A (0, 0) in the new coordinate system are A0 (1080, 0). After the user performs a touch operation, coordinates of a touch point obtained by the television are the coordinates in the new coordinate system. However, the television still updates an image according to the default coordinate system, which will cause a touch trajectory generated by the television after the display is rotated to be inconsistent with the touch operation of the user. In view of the above issue, embodiments of the disclosure provide a multi-layer superimposed display method, and the method can ensure that the image displayed by the display apparatus corresponds to the touch operation from the user through coordinate conversion.

In some embodiments, before receiving the touch trajectory input from the user, the controller of the display apparatus may adjust multiple layers to be displayed to a display direction corresponding to a first rotation state according to a current rotation state (for example, a non-landscape state, such as portrait state or inclined state), and then synthesize the multiple adjusted layers to obtain an original image.

In some embodiments, a method for the display apparatus to adjust a layer to a display direction corresponding to a first rotation state may include: first, according to the current rotation state of the display, rotating the layer to be a landscape layer, for example, when the current rotation state of the display is the portrait state, the layer is rotated counterclockwise by 90 degrees; and then, rotating a pattern in the layer clockwise by 90 degrees, so that the display direction of the pattern is a landscape direction.

In some embodiments, before the user inputs the touch trajectory, the content of the GOP2 layer may be void. The controller may store the original image into a graphic buffer region, and then copy the original image to obtain a backup image, and the backup image is moved to a native layer in the system, so that after the user inputs the touch trajectory, a response trajectory may be drawn on the backup image according to the touch trajectory; and finally, the original image in the graphic buffer region is updated according to the drawn image, so that the display apparatus updates the image presented on the display according to the image in the graphic buffer region.

In some embodiments, in order to avoid a scenario where the response trajectory is inconsistent with the touch action from the user, after the user inputs the touch trajectory, the display apparatus may obtain the coordinates of the touch point from the touch trajectory. When the display apparatus is in the portrait state, the coordinates of the touch point are the coordinates in the portrait coordinate system, for example, the coordinates of one touch point may be M (X1, Y1).

In some embodiments, when a display screen is in the portrait state, the display screen may be rotated counterclockwise by 90 degrees to be changed into the landscape state, and according to the rotation relation, a relation between the coordinates in the portrait coordinate system and the coordinates in the coordinate system in the landscape state is determined according to formulas 3 and 4:

$$X_1 = h - y \quad (3)$$

$$Y_1 = x \quad (4)$$

Where, M (X1, Y1) is the coordinate in the portrait coordinate system, m (x, y) is the coordinate corresponding to the M (X1, Y1) in the coordinate system in the landscape state, h is a length of a vertical axis in the landscape state, and when a resolution in the landscape state is 1920*1080, h=1080. According to formula (1), the formulas for converting touch coordinates in the touch trajectory into touch coordinates in the landscape state are formulas 5 and 6:

$$x = Y_1 \quad (5)$$

$$y = h - X_1 \quad (6)$$

In some embodiments, the backup image in the graphic buffer region is the image in the coordinate system in the landscape state, after converting the touch coordinates under the portrait state into the touch coordinates under the landscape state, the response trajectory may be drawn on the backup image according to the touch coordinates under the landscape state to obtain a response image of the GOP2 layer, and the response image is superimposed with the backup image to obtain the drawn image.

In some embodiments, a user operation region in the drawn image may further be obtained according to a coordinate range of the response image, and a region for presenting update of the original image is obtained according to the user operation region, wherein the region for presenting update of the original image may be the same as the user operation region on the drawn image. After obtaining the drawn image, the drawn image is rotated to the current rotation state to obtain an image to be displayed, and the currently displayed image may be refreshed to the image to be displayed. After obtaining the drawn image, the drawn image may further be taken as the original image for copying to obtain a new backup image, and the new backup image is moved to an image buffer region, which is helpful for responding after receiving a new touch trajectory.

Figure 17:
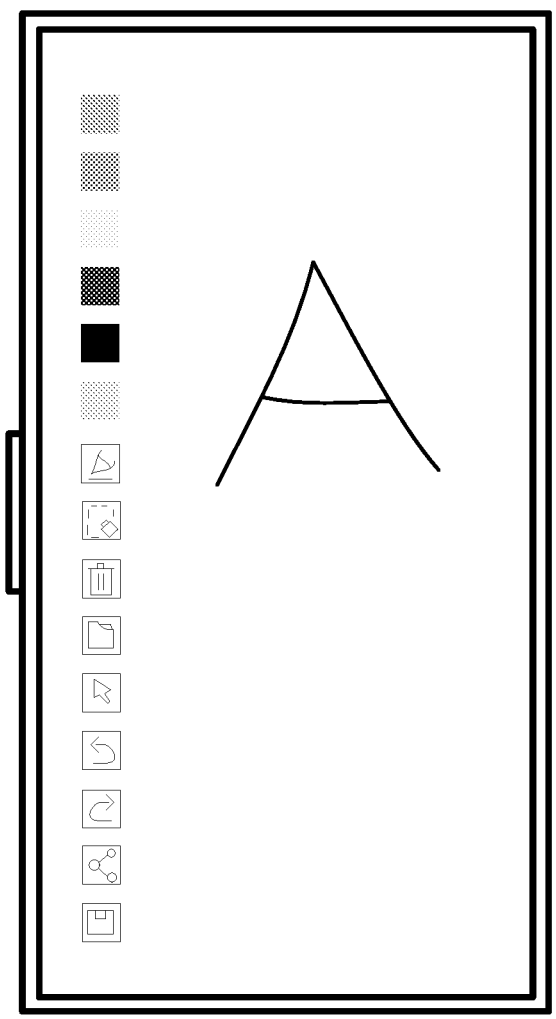
FIG. 17 illustrates a schematic diagram of a portrait state of a display apparatus according to one or more embodiments of the disclosure.

In some embodiments, the image on a region for presenting update of the original image may further be replaced with the image in the user operation region to obtain a new original image, so that the electronic whiteboard application can update the image currently presented on the display with the image to be displayed. FIG. 17 illustrates a schematic diagram of a portrait state of a display apparatus according to one or more embodiments of the disclosure. As shown in FIG. 17, by using the image display method in the above embodiments, after the user draws in the portrait state, the display may present the response trajectory consistent with the touch response trajectory from the user, for example, the user draws a letter "A", and the display apparatus can display the letter "A" at the drawing position of the user.

In some embodiments, the user may press a preset key on the remote controller to issue a rotation instruction to the display apparatus, the display apparatus starts to rotate the display according to the rotation instruction, and the controller of the display apparatus may be configured to rotate the display by 90 degrees by default and then stop rotating. When the display apparatus is in the landscape state, if a rotation instruction is received, the display apparatus is rotated clockwise to the portrait state; and when the display apparatus is in the portrait state, if a rotation instruction is received, the display apparatus is rotated counterclockwise to the landscape state. In some embodiments, in addition to the landscape state and the portrait state, the display of the display apparatus may further stay at other rotation angles such as 30 degrees and 60 degrees with respect to a horizontal axis. The user may press a preset key on the remote controller to issue a rotation instruction to the display apparatus, the display apparatus starts to rotate the display according to the rotation instruction, after the display of the display apparatus is rotated to a certain angle, the user may press the preset key on the remote controller to issue a pause rotation instruction to the display apparatus, and the display apparatus may stop rotating according to the pause rotation instruction to keep the display at the angle.

Figure 18:
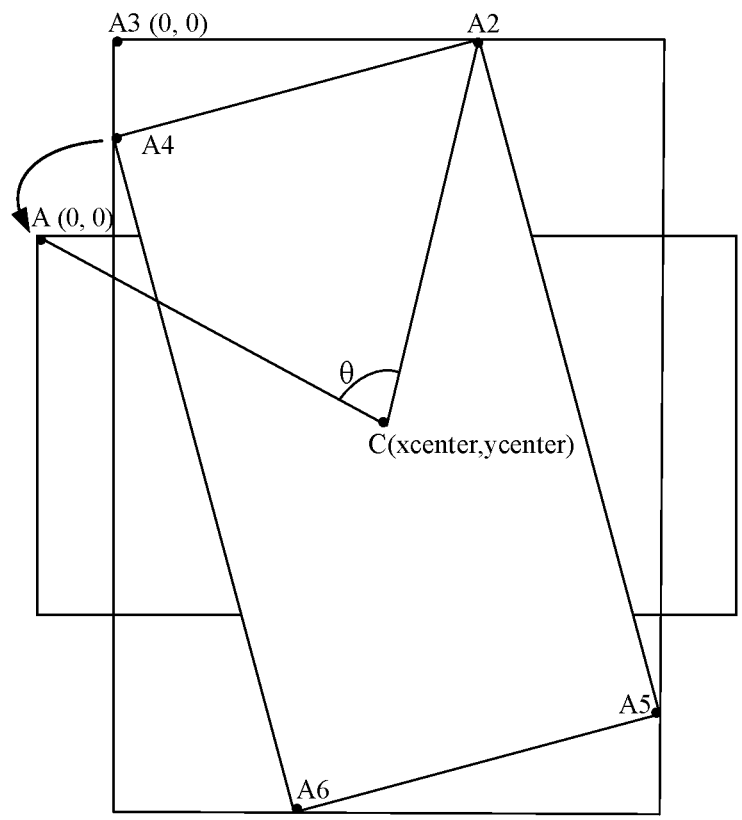
FIG. 18 illustrates a schematic diagram of rotation of a display according to one or more embodiments of the disclosure.

In some embodiments, FIG. 18 illustrates a schematic diagram of rotation of a display according to one or more embodiments of the disclosure. As shown in FIG. 18, when the display is rotated, the display may be rotated around a center C (xcenter, ycenter) of the display, and after being rotated to an angle θ, the user may input a rotation pause instruction for suspending the rotation to the display apparatus, so that the display apparatus stays at the angle θ. In FIG. 21, the vertex A (0, 0) of the display becomes the vertex A2 after rotation, under the angle θ, an upper left vertex of the rotated image is A4, an upper right vertex is A2, a lower left vertex is A6, and a lower right vertex is A5.

In some embodiments, after the display stops rotating, the controller of the display apparatus may calculate a width and a height of the rotated image according to the current angle θ and a length of a diagonal of the display. In FIG. 18, a maximum width of the rotated image is a horizontal distance between the vertexes A4 and A5, and a maximum height of the rotated image is a vertical distance between the vertexes A2 and A6. A new graphic buffer region is generated according to the width and the height of the rotated image, and a new coordinate system is established. In the new coordinate system, the coordinate origin is A3 (0, 0). In the new coordinate system, it is assumed that the upper left vertex of the rotated image is A4 (left, top), and the lower right vertex is A5 (right, bottom), for any point n (x, y) in the landscape state, after the display is rotated around the center point C (xcenter, ycenter) of the display by the angle θ, a coordinate position N (x1, y1) of the point in the new coordinate system is obtained, and a formula for calculating the coordinate position N (x1, y1) is as follows:

$$x\text{center} = (\text{width}+1)/2 + \text{left} \quad (7)$$

$$y\text{center} = (\text{height}+1)/2 + \text{top} \quad (8)$$

$$x1 = (x - x\text{center})\cos\theta - (y - y\text{center})\sin\theta + x\text{center} \quad (9)$$

$$y1 = (x - x\text{center})\sin\theta + (y - y\text{center})\cos\theta + y\text{center} \quad (10).$$

Therefore, a formula for calculating the original coordinate n (x, y) is determined as follows:

$$x = x1\cos\theta + y1\sin\theta + (1-\cos\theta)x\text{center} - y\text{center}\sin\theta \quad (11)$$

$$y = \cos\theta y1 - \sin\theta x1 + (1-\cos\theta)y\text{center} + x\text{center}\sin\theta \quad (12).$$

According to the above formulas, the touch coordinates in the touch trajectory may be converted into the touch coordinates in the landscape state, then a response image may be drawn, and then the image presented in the display is updated.

In some embodiments, the display apparatus may be configured to also respond to the touch operation during rotating, according to the coordinate conversion in the above inclined state, a response trajectory in the landscape state corresponding to the touch trajectory may be obtained, and thus the image to be displayed may be generated according to the response trajectory.

In some embodiments, the controller of the display apparatus may further detect the rotation state of the display, in the rotating process of the display apparatus, it can detect that the rotation state of the display is changed from a first rotation state to a second rotation state, and when the display is rotated to a rotation state between the first rotation state and the second rotation state, the image presented on the display may be rotated to the display direction consistent with the second rotation state. For example, in a process of rotating from the landscape state to the portrait state, the image presented on the display may be switched to the image in the portrait state when the rotation angle reaches 45 degrees, so that the user can conveniently watch the content on the display during rotation process.

In some embodiments, an application on the display may further be presented not in full screen, such as a half screen. In this case, after the portrait coordinate system is converted into the coordinate system in the landscape state, there is an offset between the coordinate system in the landscape state and a default coordinate system of the display.

Figure 19:
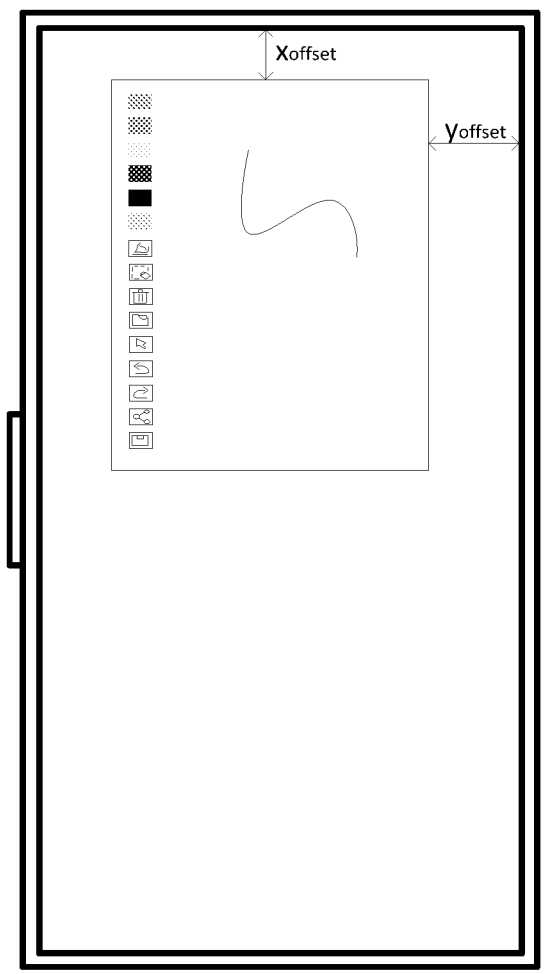
FIGS. 19-20 illustrate schematic diagrams of an interface of an electronic whiteboard application according to one or more embodiments of the disclosure.
Figure 20:
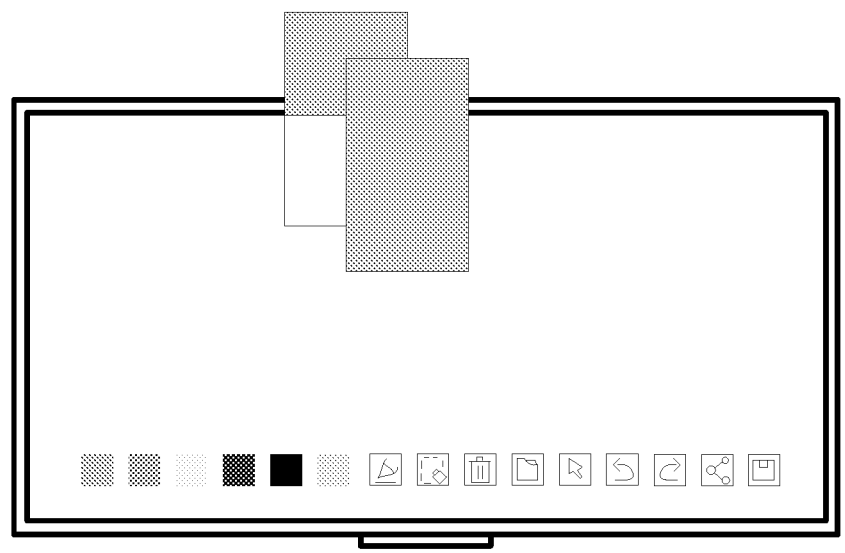

FIGS. 19-20 illustrate schematic diagrams of an interface of an electronic whiteboard application according to one or more embodiments of the disclosure. As shown in FIG. 19, in the portrait state, the electronic whiteboard application may be displayed in a non-full screen. Likewise, in the landscape state, the electronic whiteboard application may also be displayed in the non-full screen. For display in non-full screen, according to the electronic whiteboard application, a left boundary offset in the landscape state of a display screen is xoffset, an upper boundary offset in the landscape state of the display screen is yoffset, after the portrait coordinate system is converted into the coordinate system in the landscape state, an offset between the coordinate system in the landscape state and the default coordinate system of the display is obtained, namely including xoffset and yoffset.

In some embodiments, if the electronic whiteboard application is displayed in the non-full screen, after the touch coordinates in the touch trajectory are converted into the coordinates in the landscape state, it is necessary to subtract the offset from the ordinates in the landscape state, that is, the xoffset is subtracted from abscissa, and the yoffset is subtracted from ordinate in the coordinates in the landscape state, then a response image is drawn according to the coordinates for which the offset is subtracted in the landscape state, and then the image shown on the display is updated.

In some embodiments, if the content presented by the electronic whiteboard application is located at the boundary of the display, as shown in FIG. 20, boundary processing needs to be performed. The boundary processing may include left boundary processing and upper boundary processing. The left boundary processing includes: after the touch coordinates in the touch trajectory are converted into the coordinates in the landscape state, if a start coordinate of the coordinates in the landscape state is startx, and if the start coordinate startx is smaller than or equal to the xoffset, determining that an image pixel to be copied is xoffset-startx, and the start coordinate is xoffset. The upper boundary processing includes: after the touch coordinates in the touch trajectory are converted into the coordinates in the landscape state, if a start coordinate of the coordinates in the landscape state is starty, and if the start coordinate starty is smaller than or equal to yoffset, determining that an image pixel to be copied is yoffset-starty, and the start coordinate is yoffset. The response image is drawn according to the above image pixels to be copied, and then the image presented on the display is updated.

It can be seen from the above embodiments that the display apparatus synthesizes a plurality of layers in advance, and after obtaining the touch trajectory, it only need to superimpose the touch trajectory on a pre-synthesized image, and does not need to use a SurfaceFlinger service to synthesize the plurality of layers after obtaining the touch trajectory, which improves the image display efficiency.

For convenience of description, the above description has been made in combination with specific implementations. However, the above discussion in some embodiments is not intended to be exhaustive or to limit the implementations to the specific forms disclosed above. According to the above teaching, a variety of modifications and variations can be obtained. The above implementations are selected and described in order to better explain the principles and practical applications, so that those skilled in the art can better use the implementations and various modified implementations.

What is claimed is:

1. A display apparatus, comprising:
    a display, configured to display an image and/or user interface;
    a touch component, configured to detect a touch trajectory from a user; and
    a controller, connected with the display and touch component and configured to:
        present a first layer and a second layer below the first layer on the display during running of a whiteboard application, wherein the first layer is configured to receive the touch trajectory from the user, the second layer is configured to present elements of the whiteboard application, and the elements of the whiteboard application include a menu and a toolbar;
        obtain a touch trajectory pattern from the user in the first layer and a background pattern in the second layer, wherein resolution of the touch trajectory pattern is different from resolution of the background pattern;
        extract a boundary color and a boundary position of the touch trajectory pattern;
        extract a background color of a region associated with the boundary position from the second layer;
        determine an interpolation result according to the boundary color and the background color, and perform an interpolation operation on the touch trajectory pattern to generate a converted pattern; wherein resolution of the converted pattern is equal to the resolution of the background pattern; and
        superimpose the converted pattern and the background pattern to control the display to present a superimposition result of the converted pattern and the background pattern.

2. The display apparatus according to claim 1, wherein the controller is further configured to:
    receive the touch trajectory from the user in real time;
    extract a foreground color of the touch trajectory in response to the touch trajectory; and
    present the touch trajectory in the first layer according to the foreground color to generate the touch trajectory pattern.

3. The display apparatus according to claim 1, wherein the controller is further configured to:
    in response to determining that the resolution of the touch trajectory pattern is equal to the resolution of the background pattern, superimpose the touch trajectory pattern and the background pattern and not perform interpolation operation.

4. The display apparatus according to claim 1, wherein the controller is further configured to:
    detect transparency of the background pattern;
    in response to the transparency of the background pattern being full transparent or semitransparent, obtain a bottom pattern in a third layer below the second layer;
    superimpose the background pattern and the bottom pattern; and
    present a superimposition result of the background pattern and the bottom pattern in the second layer.

5. The display apparatus according to claim 4, wherein the controller is further configured to:
    detect the resolution of the background pattern and resolution of the bottom pattern;
    in response to the resolution of the background pattern being less than the resolution of the bottom pattern, extract a bottom color from the third layer;
    perform interpolation operation on the background pattern according to the bottom color; and
    superimpose the background pattern after the interpolation operation and the bottom pattern.

6. The display apparatus according to claim 4, wherein third layer is a video layer.

7. The display apparatus according to claim 1, wherein the controller is further configured to:
    traverse feature points in the touch trajectory;
    determine a color picking area in the second layer according to positions of the feature points; and obtain the background pattern by extracting pixel values and alpha value of the color taking area.

8. The display apparatus according to claim 1, wherein the controller is further configured to:
  detect an endpoint in the touch trajectory from the user; and
  in response to determining that the touch trajectory comprises the endpoint, add the touch trajectory pattern to the second layer; and
  update the background pattern in the second layer.

9. The display apparatus according to claim 1, wherein the first layer is a group of pictures (GOP) layer; and the second layer is an on-screen display (OSD) layer.

10. The display apparatus according to claim 1, wherein the touch trajectory is represented by R channel parameter, G channel parameter, B channel parameter and alpha channel parameter.

11. A method for displaying a multi-layer superimposition, comprising:
  presenting a first layer and a second layer below the first layer on a display of a display apparatus during running of a whiteboard application in the display apparatus, wherein the first layer is configured to receive a touch trajectory from a user, the second layer is configured to present elements of the whiteboard application, and the elements of the whiteboard application include a menu and a toolbar, wherein the display apparatus comprises a touch component, configured to detect the touch trajectory from the user;
  obtaining a touch trajectory pattern from the user in the first layer and a background pattern in the second layer, wherein resolution of the touch trajectory pattern is different from resolution of the background pattern;
  extracting a boundary color and a boundary position of the touch trajectory pattern;
  extracting a background color of a region associated with the boundary position from the second layer;
  determining an interpolation result according to the boundary color and the background color, and performing an interpolation operation on the touch trajectory pattern to generate a converted pattern; wherein resolution of the converted pattern is equal to the resolution of the background pattern; and
  superimposing the converted pattern and the background pattern to control the display to present a superimposition result of the converted pattern and the background pattern.

12. The method according to claim 11, further comprising:
  receiving the touch trajectory from the user in real time;
  extracting a foreground color of the touch trajectory in response to the touch trajectory; and
  presenting the touch trajectory in the first layer according to the foreground color to generate the touch trajectory pattern.

13. The method according to claim 11, further comprising:
  in response to determining that the resolution of the touch trajectory pattern is equal to the resolution of the background pattern, superimposing the touch trajectory pattern and the background pattern and not perform interpolation operation.

14. The method according to claim 11, further comprising:
  detecting transparency of the background pattern;
  in response to the transparency of the background pattern being full transparent or semitransparent, obtaining a bottom pattern in a third layer below the second layer;
  superimposing the background pattern and the bottom pattern; and
  presenting a superimposition result of the background pattern and the bottom pattern in the second layer.

15. The method according to claim 14, further comprising:
  detecting the resolution of the background pattern and resolution of the bottom pattern;
  in response to the resolution of the background pattern being less than the resolution of the bottom pattern, extracting a bottom color from the third layer;
  performing interpolation operation on the background pattern according to the bottom color; and
  superimposing the background pattern after the interpolation operation and the bottom pattern.

16. The method according to claim 14, wherein the third layer is a video layer.

17. The method according to claim 11, further comprising:
  traversing feature points in the touch trajectory;
  determining a color picking area in the second layer according to positions of the feature points; and
  obtaining the background pattern by extracting pixel values and alpha value of the color taking area.

18. The method according to claim 11, further comprising:
  detecting an endpoint in the touch trajectory from the user; and
  in response to determining that the touch trajectory comprises the endpoint, adding the touch trajectory pattern to the second layer; and
  updating the background pattern in the second layer.

19. The method according to claim 11, wherein the first layer is a group of pictures (GOP) layer; and the second layer is an on-screen display (OSD) layer.

20. The method according to claim 11, wherein the touch trajectory is represented by R channel parameter, G channel parameter, B channel parameter and alpha channel parameter.

* * * * *